US007820767B2

(12) United States Patent
El-Hibri et al.

(10) Patent No.: US 7,820,767 B2
(45) Date of Patent: Oct. 26, 2010

(54) AROMATIC POLYIMIDE COMPOSITION

(75) Inventors: Mohammad Jamal El-Hibri, Atlanta, GA (US); Leslie J. Myrick, Poplarville, MS (US); David B. Thomas, Poplarville, MS (US); Roy L. Carter, Chicago, IL (US); Nikica Maljkovic, New Orleans, LA (US); Christopher Davis, Diamondhead, MS (US); Scott A. Harding, Slidell, LA (US)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 0 days.

(21) Appl. No.: 12/281,033

(22) PCT Filed: Mar. 6, 2007

(86) PCT No.: PCT/EP2007/052103
§ 371 (c)(1),
(2), (4) Date: Aug. 28, 2008

(87) PCT Pub. No.: WO2007/101858
PCT Pub. Date: Sep. 13, 2007

(65) Prior Publication Data
US 2009/0069507 A1    Mar. 12, 2009

Related U.S. Application Data

(60) Provisional application No. 60/842,367, filed on Sep. 6, 2006, provisional application No. 60/842,368, filed on Sep. 6, 2006, provisional application No. 60/842,366, filed on Sep. 6, 2006.

(30) Foreign Application Priority Data
Mar. 7, 2006  (WO) ............... PCT/EP2006/060535

(51) Int. Cl.
C08F 283/00    (2006.01)
C08F 283/04    (2006.01)

(52) U.S. Cl. ............... 525/416; 264/176.1; 264/219; 428/411.1; 428/412; 428/480; 525/420; 525/435; 525/436; 525/437

(58) Field of Classification Search ............. 264/176.1, 264/219; 428/411.1, 412, 480; 525/420, 525/435, 436, 437, 416
See application file for complete search history.

(56) References Cited

U.S. PATENT DOCUMENTS

| 3,833,544 A | 9/1974 | Takekoshi et al. |
| 3,887,588 A | 6/1975 | Cook et al. |
| 3,965,125 A | 6/1976 | Meyers |
| 4,017,511 A | 4/1977 | Williams, III |
| 4,024,110 A | 5/1977 | Takekoshi |
| 5,227,457 A | 7/1993 | Marrocco et al. |
| 5,539,048 A | 7/1996 | Gagne et al. |
| 5,565,543 A | 10/1996 | Marrocco et al. |
| 5,646,231 A | 7/1997 | Marrocco et al. |
| 5,654,392 A | 8/1997 | Marrocco et al. |
| 5,659,005 A | 8/1997 | Marrocco et al. |
| 5,668,245 A | 9/1997 | Marrocco et al. |
| 5,670,564 A | 9/1997 | Gagne et al. |
| 5,721,335 A | 2/1998 | Marrocco et al. |
| 5,756,581 A | 5/1998 | Marrocco et al. |
| 5,760,131 A | 6/1998 | Marrocco et al. |
| 5,824,744 A | 10/1998 | Gagne et al. |
| 5,827,927 A | 10/1998 | Gagne et al. |
| 5,830,945 A | 11/1998 | Gagne et al. |
| 5,869,592 A | 2/1999 | Gagne et al. |
| 5,886,130 A | 3/1999 | Trimmer et al. |
| 6,087,467 A | 7/2000 | Marrocco et al. |
| 6,586,554 B1 | 7/2003 | Takahashi |
| 2005/0215715 A1* | 9/2005 | Schmeckpeper et al. .... 525/191 |
| 2006/0207464 A1 | 9/2006 | Maljkovic et al. |

FOREIGN PATENT DOCUMENTS

| WO | WO9318076 A1 | 9/1993 |
| WO | WO2006094988 A2 | 9/2006 |
| WO | WO2007101845 A2 | 9/2007 |
| WO | WO2007101847 A2 | 9/2007 |
| WO | WO2007101852 A2 | 9/2007 |
| WO | WO2007101857 A2 | 9/2007 |
| WO | WO2008028695 A1 | 3/2008 |

OTHER PUBLICATIONS

U.S. Appl. No. 11/850,739, filed Sep. 6, 2007, Maljkovic et al., unpublished, WO2006094988.
U.S. Appl. No. 12/061,442, filed Apr. 2, 2008, Maljkovic et al., unpublished, WO2007101857.
U.S. Appl. No. 12/281,019, filed Aug. 28, 2008, Maljkovic et al., unpublished, WO2007101847.
U.S. Appl. No. 12/281,023, filed Aug. 28, 2008, Thomas et al., unpublished, WO2007101852.
U.S. Appl. No. 12/281,027, filed Aug. 28, 2008, Myrick et al., unpublished, WO2007101845.
PCT Search Report dated Dec. 27, 2007 for International Application PCT/EP2007/052103 (3 p.).
Weast R.C., "Definitive rules for nomenclature of organic chemistry", CRC Handbook of Chemistry and Physics, 64th edition, (1983-1984), p. C1-C44, CRC Press Inc., Boca Raton, Florida (44 p.).
Randic M., "Aromaticity of Polycyclic Conjugated Hydrocarbons", Chemical Reviews (2003), vol. 103, p. 3449-3605, American Chemical Society ( 158 p.).
Flory P.J., "Principles of Polymer Chemistry", 1953, Chapter 13, p. 555, Cornell University Press (2 p.).
Standard ASTM D790, Historical 2003, "Test Methods for Flexural Properties of Unreinforced and Reinforced Plastics and Electrical Insulating Materials", p. 1-11 (12 p.).

(Continued)

Primary Examiner—Terressa M Boykin
(74) Attorney, Agent, or Firm—Oblon, Spivak, McClelland, Maier & Neustadt, L.L.P.

(57) ABSTRACT

The present invention relates to a new aromatic polyimide composition containing an aromatic polyimide and a polyarylene of a specific type, and to articles and parts of articles made thereof.

21 Claims, No Drawings

OTHER PUBLICATIONS

Standard ASTM D256, Historical 2005 Revision A, "Test Methods for Determining the Izod Pendulum Impact Resistance of Plastics", p. 1-20 (21 p.).

Standard ASTM D638, Historical 2003, "Test Method for Tensile Properties of Plastics", p. 1-15 (16 p.).

Standard ASTM E1354, Historical 2004 Revision A, "Test Method for Heat and Visible Smoke Release Rates for Materials and Products Using an Oxygen Consumption Calorimeter", p. 1-18 (19 p.).

Standard ASTM D3763, 2006, "Test Method for High Speed Puncture Properties of Plastics Using Load and Displacement Sensors", p. 1-9 (10 p.).

Zoller P. et al., "Pressure-Volume-Temperature Properties of Blends of Poly(2,6-dimethyl-1,4-phenylene Ether) with Polystyrene", Journal of Polymer Science : Polymer Physics Edition (1982), 20, p. 1385-97, John Wiley & Sons, Inc. (14 p.).

Marrocco M. et al., "Poly-X(TM) self reinforced polymers : processible molecular composites", 39th International SAMPE Symposium and Exhibition (Apr. 11-14, 1994), p. 1063-72, Society for the Advancement of Material and Process Engineering (10 p.).

Ha Y.-H. et al., "Miscible blends of poly(benzoyl paraphenylene) and polycarbonate", Polymer (2001), 42(15), p. 6463-72, Elsevier Science Ltd. (10 p.).

Naitove M.H., "Self-reinforcing thermoplastic is harder, stronger, stiffer without added fibers", Plastics Technology (Jul. 2003), Gardner Publications Inc. (2 p.).

Ha Y.-H. et al., "Investigation of the phase behaviour of blends of poly(benzoyl paraphenylene) and various thermoplastics", 58th ANTEC—SPE (2000), vol. 2, p. 2532-7, SPE (6 p.).

* cited by examiner

AROMATIC POLYIMIDE COMPOSITION

CROSS-REFERENCE TO RELATED APPLICATIONS

The present application is (1) a national stage application under 35 U.S.C. §371 of International Application No. PCT/EP2007/052103, filed Mar. 6, 2007, which claims the benefit under 35 U.S.C. §119(a) and (b) of (i) PCT application no. PCT/EP2006/060535 filed Mar. 7, 2006, and which claims the benefit under 35 U.S.C. §119(e) of (ii) U.S. provisional application No. 60/842,367 filed Sep. 6, 2006, (iii) U.S. provisional application No. 60/842,368 filed Sep. 6, 2006, and (iv) U.S. provisional application No. 60/842,366 filed Sep. 6, 2006; (2) is a continuation-in-part of U.S. application Ser. No. 11/850,739 filed Sep. 6, 2007, which is a continuation of PCT application no. PCT/EP2006/060535 filed Mar. 7, 2006; and (3) further claims the benefit under 35 U.S.C. §365(a) of PCT Application No. PCT/EP2006/060535, filed Mar. 7, 2006, the whole content of all of them these applications being herein incorporated by reference for all purposes.

FIELD OF THE INVENTION

The present invention relates to a new aromatic polyimide composition, and to articles and parts of articles made thereof.

BACKGROUND OF THE INVENTION

Aromatic polyimides, in particular aromatic polyetherimides, form a class of thermoplastic polymers that offer some excellent engineering properties such as very high heat resistance, excellent melt processability, good elongation properties and high impact resistance. They have also rather high strength, rather high stiffness and rather high fire resistance. Notwithstanding, in certain demanding industries such as commercial aviation and other civil transports, the level of properties achieved by aromatic polyimides, in particular polyetherimides, is insufficient.

Polyarylenes, especially polyphenylenes, exhibit an exceptionally high strength, stiffness and fire resistance; they exhibit also an exceptionally high hardness, scratch resistance and dimensional stability. As concerns these properties, the level of properties achieved by polyarylenes usually well exceeds that required by the most severe end uses. Unfortunately, polyarylenes have serious limitations in toughness-related properties, in particular in terms of impact resistance and elongation properties.

To meet the need for increased strength, stiffness and fire resistance, it has already been tried to blend certain aromatic polyimides, such as polyetherimides, with certain classes of polyarylenes, known as Parmax® 1000 and 1200 polyphenylenes (Parmax® 1200 is now commercialized by SOLVAY ADVANCED POLYMERS under the trade name PRIMO-SPIRE™ PR-120). While in these aromatic polyimide-polyarylene blends of the prior art, the polyarylene provides indeed an exceptionally high level of strength and stiffness (which usually exceeds the level needed in the most severe aircraft and other civil transportation applications), these blends have still some limitations in terms of fire resistance. Besides, as the skilled in the art may have have dreaded in the light of the properties of neat polyarylenes, the prior art aromatic polyimide-polyarylene blends suffer from limitations in terms of elongation properties and impact resistance; also, they have rather poor, or even poor, melt compatibility and processability, which probably explains why the skilled person generally prepared them either by solution blending or by reactive blending (e.g. starting from macromers of rigid-rod polyphenylenes).

Polymer blends have been widely taught and employed in the art. As broad as this statement may be, the blending of polymers remains an empirical art and the selection of polymers for a blend giving special properties is, in the main, an Edisonian-like choice. Certain attributes of polymer blends are more unique than others. The more unique attributes when found in a blend tend to be unanticipated properties. According to Zoller and Hoehn, Journal of Polymer Science, Polymer Physics Edition, vol. 20, pp. 1385-1397 (1982): "Blending of polymers is a useful technique to obtain properties in thermoplastic materials not readily achieved in a single polymer. Virtually all technologically important properties can be improved in this way, some of the more important ones being flow properties, mechanical properties (especially impact strength), thermal stability, and price. ( . . . ) Ultimately, the goal of such modeling and correlation studies should be the prediction of blend properties from the properties of the pure components alone. We are certainly very far from achieving this goal."

In the field of miscibility or compatibility of polymer blends, the art has found predictability to be unattainable, even though considerable work on the matter has been done. According to authorities, "It is well known that, regarding the mixing of thermoplastic polymers, incompatibility is the rule and miscibility and even partial miscibility is the exception. Since most thermoplastic polymers are immiscible in other thermoplastic polymers, the discovery of a homogeneous mixture or partially miscible mixture of two or more thermoplastic polymers is, indeed, inherently unpredictable with any degree of certainty, for example, see P. J. Flory, Principles of polymer Chemistry, Cornell University Press, 1953, Chapter 13, page 555."

There remains a strong need for a polymer material offering a superior balance of properties, including at least part of, and preferably all, the following ones:
 very high strength, higher than that of prior art neat aromatic polyimides;
 very high stiffness, higher than that of prior art neat aromatic polyimides;
 high fire resistance, higher than that of prior art neat aromatic polyimides and aromatic polyimide-polyarylene blends;
 good elongation properties, in progress with regard to those of the prior art aromatic polyimide-polyarylene blends;
 high impact resistance, higher than that of the prior art aromatic polyimide-polyarylene blends, and ideally approaching or even exceeding by certain aspects that of the neat aromatic polyimides; and
 good melt processability, in substantial progress when compared to that of the prior art aromatic polyimide-polyarylene blends.

THE INVENTION

This need, and still other ones, are unexpectedly met by a blend (B) comprising an aromatic polyimide and a polyarylene of a specific type.

Thus, in its principal aspect, the present invention is directed to a blend (B) comprising:
 at least one aromatic polyimide (P1), and
 at least one polyarylene (P2), more than 50 wt. % of the recurring units thereof are optionally substituted arylene groups [recurring units (R2)], each of said recurring units (R2) being linked by each of its two ends to two other optionally substituted arylene groups via a direct C—C linkage, and said recurring units (R2) being a mix (M) consisting of:

between 0 and 75 mole %, based on the total number of moles of recurring units (R2), of rigid rod-forming arylene units (R2a), optionally substituted by at least one monovalent substituting group, with between 25 and 100 mole %, based on the total number of moles of recurring units (R2), of kink-forming arylene units (R2b), optionally substituted by at least one monovalent substituting group.

Another aspect of the present invention is directed to a method for preparing the blend (B) as above described which comprises melt mixing the at least one aromatic polyimide (P1) with the at least one polyarylene (P2).

Still another aspect of the present invention is directed to a shaped article or a part of a shaped article comprising the blend (B) as above described, or prepared by the method as above described.

Still other aspects of the present invention are directed to the use, in the blend (B) as above described, of the polyarylene (P2)

as fire-stabilizer additive of the aromatic polyimide (P1), in particular as heat release reducer of the aromatic polyimide (P1) [peak heat release is advantageously determined using the ASTM E-1354 cone calorimetry method] and/or as smoke reducer of the aromatic polyimide (P1) [the total smoke generated prior to and during flaming combustion $S_A$ is advantageously determined using the ASTM E-1354 cone calorimetry method]; and/or as toughener of the aromatic polyimide (P1), in particular for increasing the level of the impact resistance, as possibly determined by notched IZOD test ASTM D-256.

According to the above aspects, the material of concern may be notably in the form of shaped articles or parts of shaped articles.

DETAILED DESCRIPTION OF THE INVENTION

Generally Applicable Preferences as Concerns the Amounts of Aromatic Polyimide (P1) and the Polyarylene (P2)

The weight of the aromatic polyimide (P1), based on the total weight of the blend (B), is advantageously above 30%, preferably above 50%, more preferably of at least 70% and still more preferably of at least 80%. On the other hand, the weight of the aromatic polyimide (P1), based on the total weight of the blend (B), is advantageously of at most 99%, preferably of at most 95%, more preferably of at most 92.5% and still more preferably of at most 90%.

The weight of the polyarylene (P2), based on the total weight of the blend (B), is advantageously of at least 1%, preferably of at least 5%, more preferably of at least 7.5%, and still more preferably of at least 10%. On the other hand, the weight of the polyarylene (P2), based on the total weight of the blend (B), is advantageously below 70%, preferably below 50%, more preferably of at most 30% and still more preferably of at most 20%.

The weight of the polyarylene (P2), based on the combined weight of the aromatic polyimide (P1) and the polyarylene (P2), is advantageously of at least 1%, preferably of at least 5%, more preferably of at least 7.5%, and still more preferably of at least 10%. On the other hand, the weight of the polyarylene (P2), based on the combined weight of the aromatic polyimide (P1) and of the polyarylene (P2), is advantageously below 70%, preferably below 50%, more preferably of at most 30%, and still more preferably of at most 20%.

The combined weight of the aromatic polyimide (P1) and of the polyarylene (P2), based on the total weight of the blend (B), is advantageously above 25%, preferably above 50%, more preferably above 80%, and still more preferably above 95%. Excellent results were obtained when the blend (B) consisted essentially of, or even consisted of, the aromatic polyimide (P1) and the polyarylene (P2).

Particular Embodiment with Other Preferences as Concerns the Amounts of Aromatic Polyimide (P1) and the Polyarylene (P2)

In this particular embodiment, the polyarylene (P2) is contained in the blend (B) in an amount higher than that of the aromatic polyimide (P1).

According to this particular embodiment:

the weight of the aromatic polyimide (P1), based on the combined weight of the aromatic polyimide (P1) and the polyarylene (P2), is advantageously of at least 1%, preferably at least 5%, more preferably at least 10%, still more preferably at least 20% and the more preferably above 25%; on the other hand, the weight of the aromatic polyimide (P1), based on the combined weight of the aromatic polyimide (P1) and the polyarylene (P2), is advantageously below 45%; examples of particularly suitable weight amounts of the aromatic polyimide (P1) are 30, 35 and 40%;

the weight of the aromatic polyimide (P1), based on the total weight of the blend (B), is advantageously of at least 1%, preferably of at least 5%, more preferably of at least 10%, still more preferably of at least 20% and most preferably above 25%; on the other hand, the weight of the aromatic polyimide (P1), based on the total weight of the blend (B), is advantageously of above 45%; examples of particularly suitable weight amounts of the aromatic polyimide (P1) are 30, 35 and 40%;

the weight of the polyarylene (P2), based on the total weight of the blend (B), is advantageously above 55%; on the other hand, the weight of the polyarylene (P2), based on the total weight of the blend (B), is advantageously of at most 99%, preferably of at most 95%; more preferably of at most 90%, still more preferably of at most 80% and most preferably below 75%; examples of particularly suitable weight amounts of the polyarylene (P2) are 60, 65 and 70%; and the combined weight of the aromatic polyimide (P1) and of the polyarylene (P2), based on the total weight of the blend (B), is advantageously above 25%, preferably above 50%, more preferably above 80%, and still more preferably above 90%.

The Aromatic Polyimide (P1)

As previously mentioned, the blend (B) comprises at least one aromatic polyimide (P1).

The aromatic polyimide (P1) is any polymer of which more than 50 wt. % of the recurring units (R1) comprise at least one aromatic ring and least one imide group.

The imide groups contained in the recurring units (R1) can be imide groups as such [formula (I)] and/or in their amic acid form [formula (II)]:

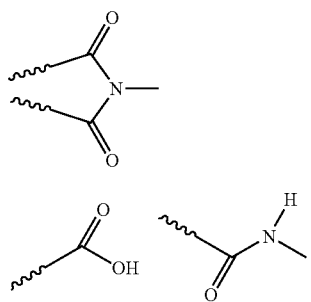

formula (I)

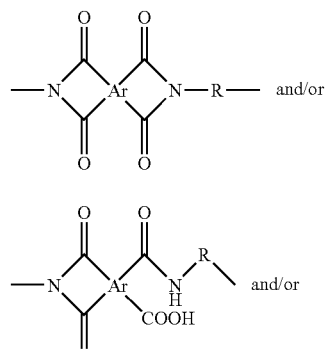

formula (VII)

and/or formula (II)

The imide groups, as such and/or in their corresponding amic acid form, are advantageously linked to an aromatic ring, as illustrated below:

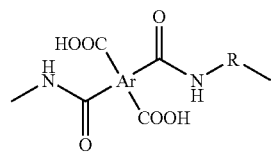

and/or formula (VIII)

formula (III)

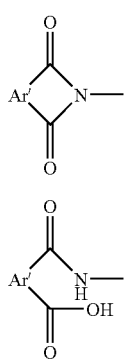

formula (IX)

where:

Ar is:

formula (IV)

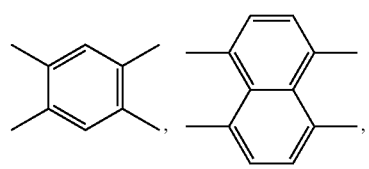

whereas Ar' denotes a moiety containing at least one aromatic ring.

The imide groups are advantageously present as condensed aromatic system, yielding a five- or six-membered heteroaromatic ring, such as, for instance, with benzene [phthalimide-type structure, formula (V)] and naphthalene [naphthalimide-type structure, formula (VI)].

formula (V)

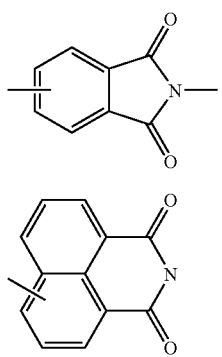

formula (VI)

with X =

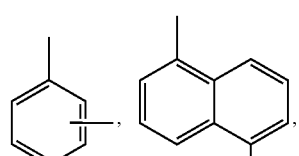

with n = 1,2,3,4 or 5;

—R is:

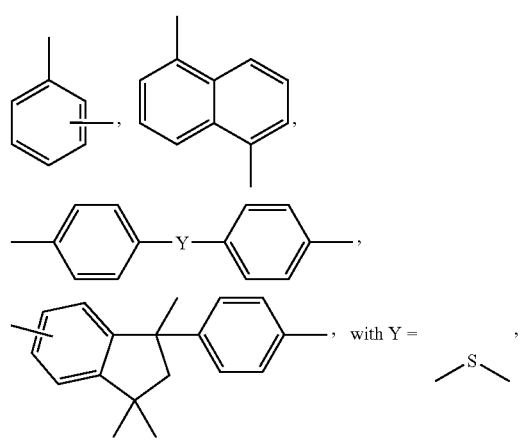

, with Y =

In a first particular embodiment, the recurring units (R1) of the aromatic polyimide (P1) are free from ether and from amide groups other than those possibly included in the amic acid form of the imide groups [recurring units (R1a)].

Recurring units (R1a) are preferably of one or more formulae (VII), (VIII) and (IX) here below:

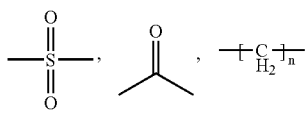

with n = 0,1,2,3,4 or 5.

In a second particular embodiment, the aromatic polyimide (P1) is an aromatic polyamide-imide. For the purpose of the present invention, an aromatic polyamide-imide is intended to denote any polymer of which more than 50 wt. % of the recurring units (R1) comprise at least one aromatic ring, at least one imide group, as such and/or in its amic acid form, and at least one amide group which is not included in the amic acid form of an imide group [recurring units (R1b)].

The recurring units (R1b) are preferably:

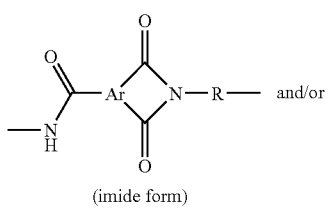

(imide form)

(X) and/or

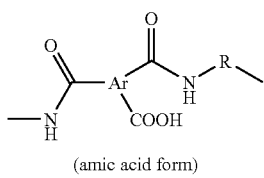

(amic acid form)

(XI)

where:

Ar is:

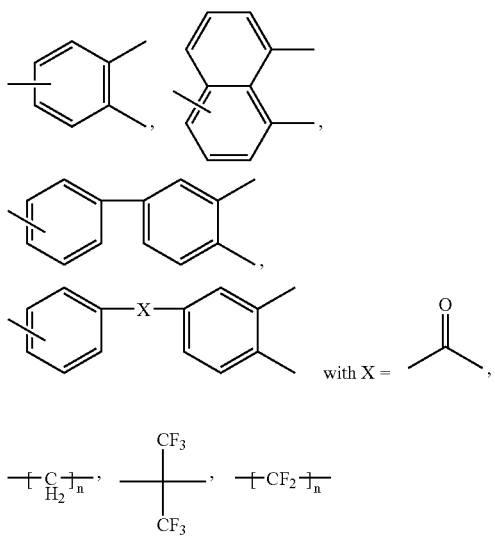

with n = 1,2,3,4 or 5;

R is:

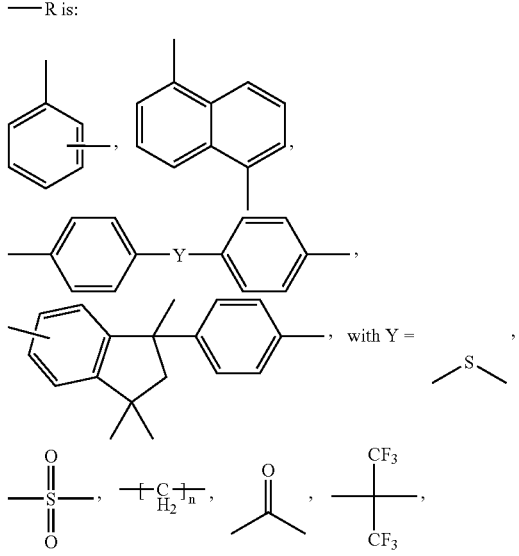

with Y =

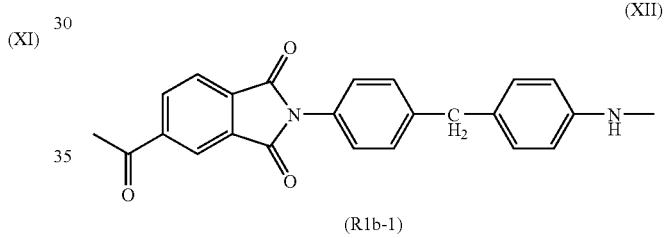

with n = 0,1,2,3,4 or 5.

More preferably, recurring units (R1b) are chosen from:

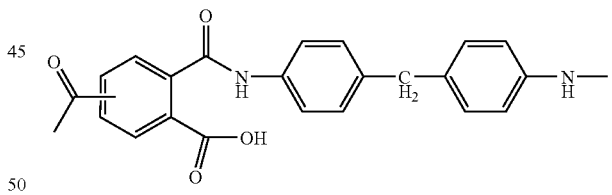

(R1b-1)

and/or the corresponding amide-amic acid containing recurring unit:

(XII)

(XIII)

wherein the attachment of the two amide groups to the aromatic ring as shown in (XIII) will be understood to represent the 1,3 and the 1,4 polyamide-amic acid configurations;

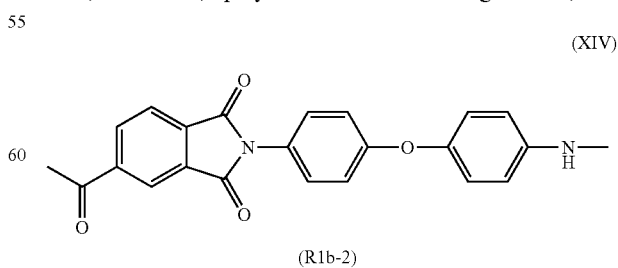

(R1b-2)

(XIV)

and/or the corresponding amide-amic acid containing recurring unit:

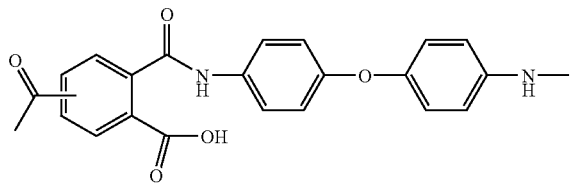
(XV)

wherein the attachment of the two amide groups to the aromatic ring as shown in (XV) will be understood to represent the 1,3 and the 1,4 polyamide-amic acid configurations; and

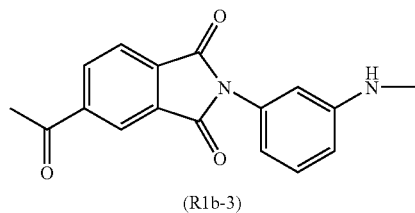
(XVI)

(R1b-3)

and/or the corresponding amide-amic acid containing recurring unit:

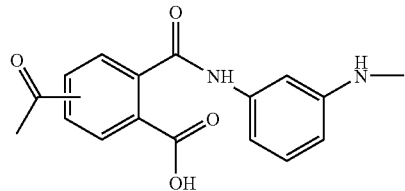
(XVII)

wherein the attachment of the two amide groups to the aromatic ring as shown in (XVII) will be understood to represent the 1,3 and the 1,4 polyamide-amic acid configurations.

Recurring units (R1b) are preferably a mix of recurring units (R1b-2) and (R1b-3). Polyamide-imides essentially all, if not all, the recurring units are recurring units complying with this criterion are commercialized by Solvay Advanced Polymers as TORLON® polyamide-imides.

The aromatic polyamide-imide can be notably manufactured by a process including the polycondensation reaction between (i) at least one acid monomer chosen from trimellitic anhydride and trimellitic anhydride monoacid halides and (ii) at least one comonomer chosen from diamines and diisocyanates.

Among the trimellitic anhydride monoacid halides, trimellitic anhydride monoacid chloride is preferred.

The comonomer comprises preferably at least one aromatic ring. Besides, it comprises preferably at most two aromatic rings. More preferably, the comonomer is a diamine. Still more preferably, the diamine is chosen from the group consisting of 4,4'-diaminodiphenylmethane, 4,4'-diaminodiphenylether, m-phenylenediamine and mixtures thereof.

In a third embodiment, to which the preference is generally given, the aromatic polyimide (P1) is an aromatic polyetherimide. For the purpose of the present invention, an aromatic polyetherimide is intended to denote any polymer of which more than 50 wt. % of the recurring units (R1) comprise at least one aromatic ring, at least one imide group, as such and/or in its amic acid form, and at least one ether group [recurring units (R1c)].

Recurring units (R1-c) may optionally further comprise at least one amide group which is not included in the amic acid form of an imide group.

A first class of aromatic polyetherimides consists of those wherein the recurring units (R1) are chosen from:

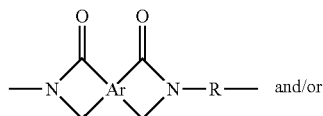
formula (XVIII)

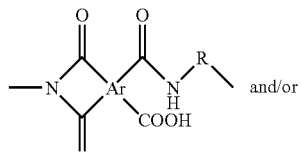
formula (XIX)

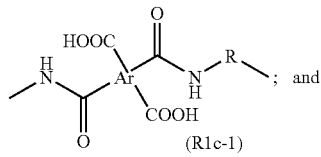
formula (XX)

(R1c-1)

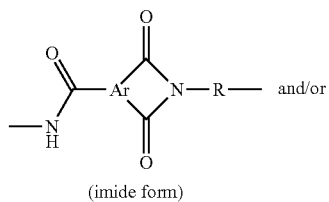
(XXI)

(imide form)

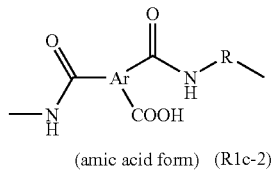
(XXII)

(amic acid form) (R1c-2)

where:
Ar is:

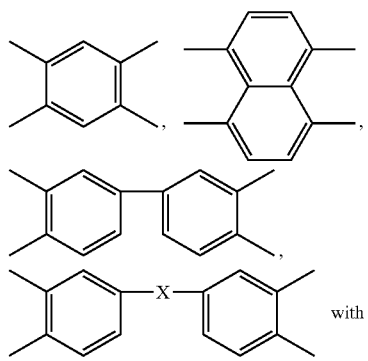
with X =

-continued $$\overset{O}{\underset{}{\|}}\!\!-\!\!\underset{}{C}\!\!-\!\!,\quad -(\underset{H_2}{C})_n-,$$

with n = 1,2,3,4 or 5;

—R is:

[structure: 3,3'-bis(phenoxy)biphenyl linker]

[structure: 4,4'-diphenyl ether linker]

Examples of aromatic polyimides (P1) belonging to this first class of aromatic polyetherimides are those wherein the recurring units (R1) are of formula:

(XXIII)

[structure of polyimide repeating unit with pyromellitimide and bis(phenoxy)biphenyl]

and/or its two corresponding amic acid forms [see formulae (XIX) and (XX) vs. the wholly imide form of formula (XVIII)].

Aromatic polyetherimides wherein essentially all, if not all, the recurring units are of formula (XXIII), and/or their two corresponding amic acid forms, are notably commercially available from Mitsui as AURUM® polyimide.

A second class of aromatic polyetherimides is composed of those wherein the recurring units (R1) are recurring units (R1c-3) of formula (XXIV)

$$-O-Z\overset{\underset{C}{\|}}{\underset{C}{\|}}N-R_2-N\overset{\underset{C}{\|}}{\underset{C}{\|}}Z-O-R_1-$$

wherein:
(i) —O—Z is a member selected from (i-a)

(XXV)

[phenyl ether with $(R_5)_{0-3}$ substituents]

wherein $R_5$ is independently hydrogen, lower alkyl or lower alkoxy;

(i-b)

(XXVI)

[naphthyl ether structure]

wherein the oxygen may be attached to either ring and located ortho or para to one of the bonds of the imide carbonyl groups, and (i-c)

(XXVII)

[naphthyl ether structure]

wherein the oxygen may also be attached to either ring and located ortho or para to one of the bonds of the imide carbonyl groups (ii) $R_1$ is selected from
(ii-a) substituted or unsubstituted aromatic radicals such as (XXVIII)

[phenyl with $(R_3)_{0-4}$ substituents] and

-continued (XXIX)

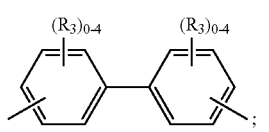

(ii-b) divalent radicals of the formula:

(XXX)

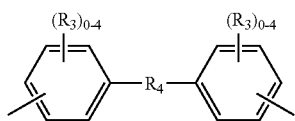

wherein $R_3$ is independently C1 to C6 alkyl, aryl or halogen and R4 is selected from —O—, —S—, —SO$_2$—, —SO—, alkylenes of 1 to 6 carbon atoms, cycloalkylenes of 4 to 8 carbon atoms, alkylidenes of 1 to 6 carbon atoms or cycloalkylidenes of 4 to 8 carbon atoms;

(iii) $R_2$ is selected from aromatic hydrocarbon radicals having from 6 to 20 carbon atoms and halogenated derivatives thereof, or alkyl substituted derivatives thereof, wherein the alkyl group contains 1 to 6 carbon atoms, alkylene and cycloalkylene radicals having from 2 to 20 carbon atoms and C2 to C8 alkylene terminated polydiorganosiloxanes or a divalent radical of the formula (XXX) wherein $R_3$ and $R_4$ are as previously defined.

The recurring units (R1c-3) may be contained in the aromatic polyetherimide (P1) as such and/or in their two amic acid forms.

These polyetherimides are prepared by methods well known in the art as set forth in, for example, U.S. Pat. Nos. 3,833,544, 3,887,588, 4,017,511, 3,965,125 and 4,024,110.

The aromatic polyetherimides wherein the recurring units (R1) are recurring units (R1c-3) may, for example, be prepared by effecting reaction in the presence of a dipolar aprotic solvent of a mixture of ingredients comprising, for instance, (1) a bis(nitrophthalimide) of the general formula:

(XXXI)

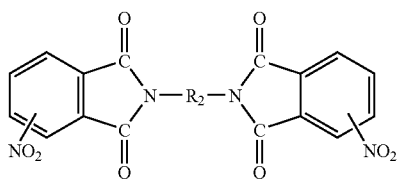

wherein $R_2$ is defined as hereinabove, and (2) an alkali metal salt of an organic compound of the general formula:

MO—R$_1$—OM       (XXXII)

wherein M is an alkali metal and R1 is defined as hereinabove.

The diamines are as described infra, when discussing the third class of aromatic polyetherimides.

The preferred nitrophthalic anhydrides useful in the present invention are 3-nitrophthalic anhydride, 4-nitrophthalic anhydride and mixtures thereof.

A third class of aromatic polyetherimides consists of those wherein the recurring units (R1) are recurring units (R1c-4)

(XXXIII)

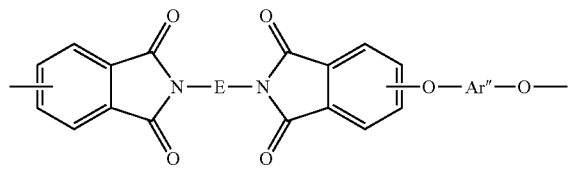

as such, and/or in their amic acid forms (XXXIV)

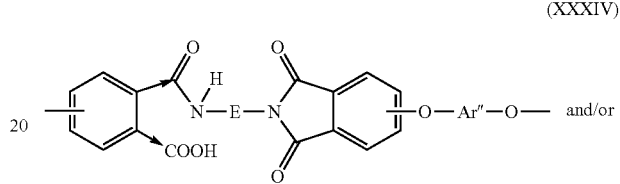 and/or (XXXV)

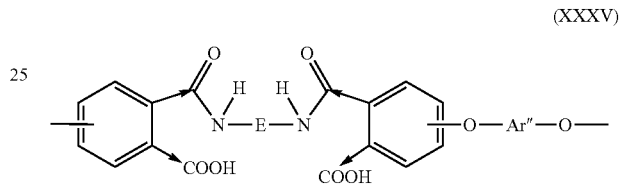

wherein:
the → denotes isomerism so that in any recurring unit the groups to which the arrows point may exist as shown or in an interchanged position;
E is chosen from:
(E-i)

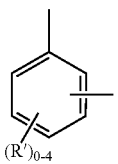

with the R' being, independently from each other, alkyl radicals comprising from 1 to 6 carbon atoms, aryls or halogens;
(E-ii)

with n=integer from 1 to 6;
(E-iii)

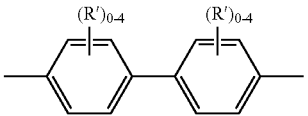

with the R' being, independently from each other, alkyl radicals comprising from 1 to 6 carbon atoms, aryls or halogens;

(E-iv)

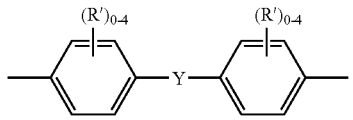

with the R' being, independently from each other, alkyl radicals comprising from 1 to 6 carbon atoms, aryls or halogens;
and Y being chosen from:
(Y-i) alkylenes of 1 to 6 carbon atoms, in particular

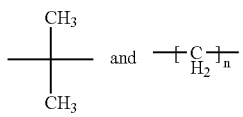

with n=integer from 1 to 6,
(Y-ii) perfluoroalkylenes of 1 to 6 carbon atoms, in particular

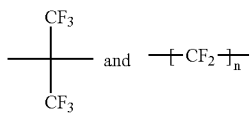

with n=integer from 1 to 6,
(Y-iii) cycloalkylenes of 4 to 8 carbon atoms;
(Y-iv) alkylidenes of 1 to 6 carbon atoms;
(Y-v) cycloalkylidenes of 4 to 8 carbon atoms;

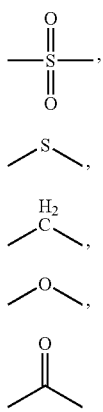

(Y-vi)

(Y-vii)

(V-viii)

(Y-ix)

(Y-x)

Ar" is selected from:
(Ar"-i) aromatic hydrocarbon radicals having from 6 to 20 carbon atoms and halogenated substituted thereof, or alkyl substituted derivatives thereof, wherein the alkyl substituting group contains 1 to 6 carbon atoms, such as:

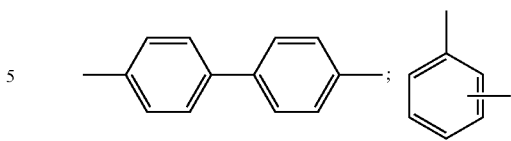

and halogenated substituted thereof, or alkyl substituted derivatives thereof, wherein the alkyl substituting group contains from 1 to 6 carbon atoms;

(Ar"-ii)

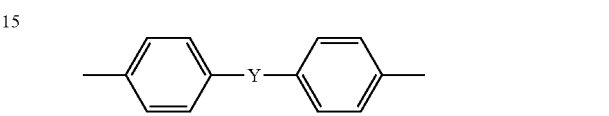

with Y being Chosen from (Y-i), (Y-ii), (Y-iii), (Y-iv), (Y-v), (Y-vi), (Y-vii), (Y-viii), (Y-ix) and (Y-x), as above defined,
(Ar"-iii) alkylene and cycloalkylene radicals having from 2 to 20 carbon atoms, and
(Ar"-iv) terminated polydiorganosiloxanes.

The aromatic polyetherimides wherein the recurring units (R1) are recurring units (R1c-4) may be prepared by any of the methods well-known to those skilled in the art including the reaction of any aromatic bis(ether anhydride)s of the formula

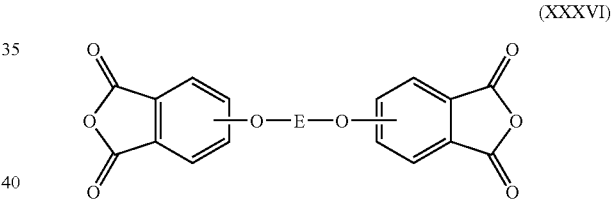

(XXXVI)

where E is as defined hereinbefore, with a diamino compound of the formula $$H_2N—Ar"—NH_2$$ (XXXVII)

where Ar" is as defined hereinbefore. In general, the reactions can be advantageously carried out employing well-known solvents, e.g., o-dichlorobenzene, m-cresol/toluene, N,N-dimethylacetamide, etc., in which to effect interaction between the dianhydrides and diamines, at temperatures of from about 20° C. to about 250° C.

Alternatively, these polyetherimides can be prepared by melt polymerization of any dianhydrides of formula (XXXVI) with any diamino compound of formula (XXXVII) while heating the mixture of the ingredients at elevated temperatures with concurrent intermixing.

The aromatic bis(ether anhydride)s of formula (XXXVI) include, for example:
2,2-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;

4,4'-bis(2,3-dicarboxyphenoxy)benzophenone dianhydride;
4,4'-bis(2,3-dicarboxyphenoxy)diphenyl sulfone dianhydride;
2,2-bis[4 (3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)benzophenone dianhydride;
4-(2,3-dicarboxyphenoxy)-4'-(3,4-dicarboxyphenoxy) diphenyl-2,2-propane dianhydride; etc. and mixtures of such dianhydrides.

The organic diamines of formula (XXXVII) include, for example, m-phenylenediamine, p-phenylenediamine, 2,2-bis (p-aminophenyl)propane, 4,4'-diaminodiphenyl-methane, 4,4'-diaminodiphenyl sulfide, 4,4'-diamino diphenyl sulfone, 4,4'-diaminodiphenyl ether, 1,5-diaminonaphthalene, 3,3'-dimethylbenzidine, 3,3'-dimethoxybenzidine,

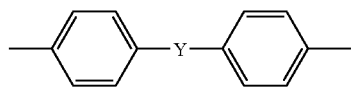

with Y being Chosen from (Y-i), (Y-ii), (Y-iii), (Y-iv), (Y-v), (Y-vi), (Y-vii), (Y-viii), (Y-ix) and (Y-x), as above defined.

More preferably, Ar" is

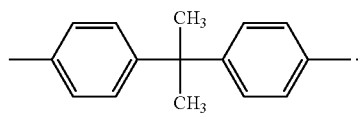

Good results were obtained when the recurring units (R1c-4) were recurring units of formula (XXXVIII) as such, in imide form, and/or in amic acid forms [formulae (XXXIX) and (XL)]:

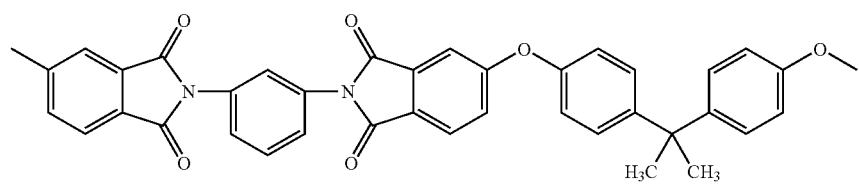
(XXXVIII)

and/or

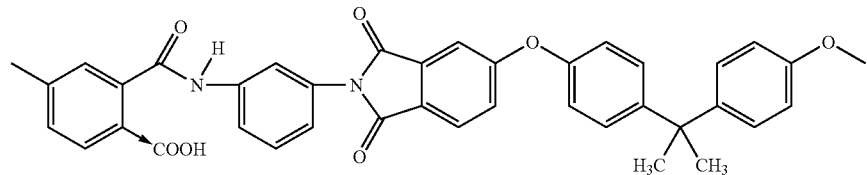
(XXXIX)

and/or

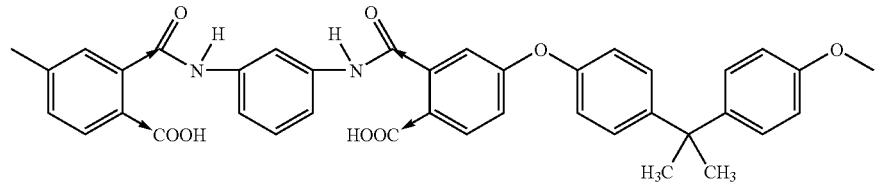
(XL)

In the recurring units (R1c-4), E is preferably chosen from (E-i)

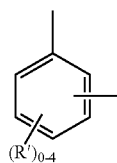

with the R' being, independently from each other, alkyl radicals comprising from 1 to 6 carbon atoms, aryls or halogens; more preferably, E is unsubstituted m-phenylene.

Besides, in the recurring units (R1c-4), Ar" is preferably chosen from (Ar"-ii)

wherein in formulae (XXXIX) and (XL) the → denotes isomerism so that in any recurring unit the groups to which the arrows point may exist as shown or in an interchanged position.

Among all the aromatic polyetherimides, those belonging to this third class are generally preferred.

Embodiment (E*)

In a fourth and particular embodiment (E*), the aromatic polyimide (P1) is a polyimidoethersulfone, namely a polymer of which at least 5 wt. % of the recurring units are recurring units (R1-$SO_2$) of formula (XLI), (XLII) and/or (XLIII), as represented below:

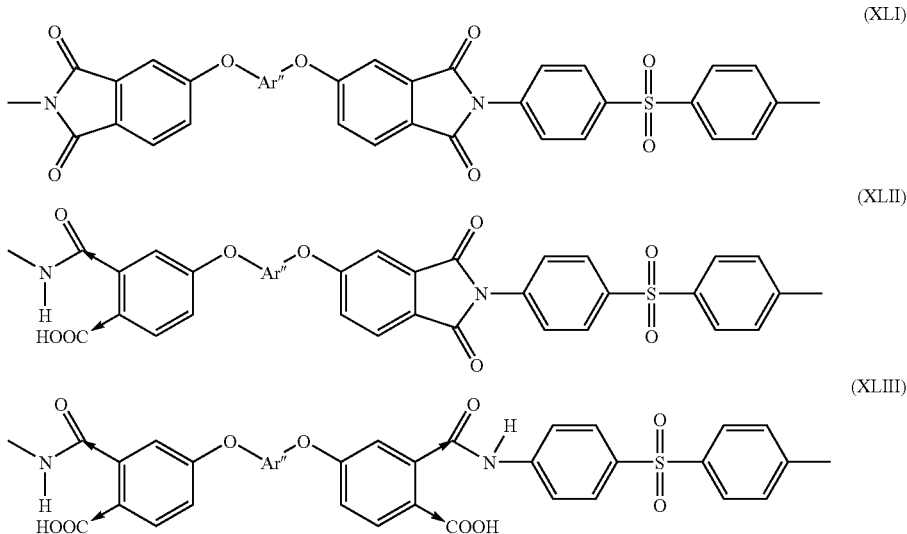

wherein:
- (XLII) and (XLIII) are the amic acid forms corresponding to the imide form (XLI);
- the → denotes isomerism so that in any recurring unit the groups to which the arrows point may exist as shown or in an interchanged position;
- Ar" is chosen among the following structures:

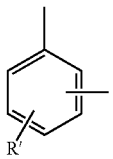

with the linking groups being in ortho, meta or para position and R' being a hydrogen atom or an alkyl radical comprising from 1 to 6 carbon atoms,

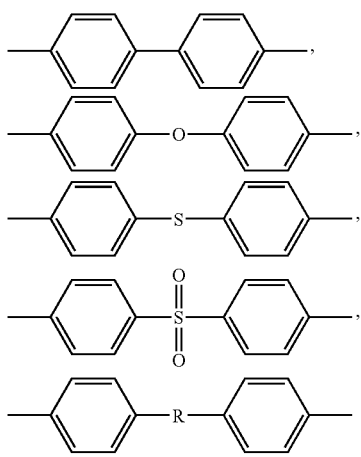

with R being an aliphatic divalent group of up to 6 carbon atoms, such as methylene, ethylene, isopropylene and the like, and mixtures thereof.

In embodiment (E*), preferably more than 50 wt. %, and more preferably more than 90 wt. % of the recurring units of the polyimidoethersulfone are recurring units (R1-$SO_2$); still more preferably, all the recurring units of the polyimidoethersulfone are recurring units (R1-$SO_2$).

Also in embodiment (E*), the polyarylene (P2) may meet all the characteristics of the polyphenylenes described in PCT/EP2006/060535, as long as they are compatible with those of the polyarylene (P2) described in the present document.

The person skilled in the art will understand that the invention is not intended to be limited to this particular embodiment (E*), but encompasses also any embodiment other than (E*) which is described in the present document.

Preferably more than 75 wt. % and more preferably more than 90 wt. % of the recurring units of the aromatic polyimide (P1) are recurring units (R1). Still more preferably, essentially all, if not all, the recurring units of the aromatic polyimide (P1) are recurring units (R1).

Excellent results were obtained when the aromatic polyimide (P1) was chosen from aromatic polyetherimides of which essentially all, if not all, the recurring units were of formula (XXXVIII), and/or their corresponding amic acid forms (XXXIX) and/or (XL). Such aromatic polyimides are notably commercially available form General Electric as ULTEM® polyetherimides.

The blend (B) can comprise one and only one aromatic polyimide (P1). Alternatively, it can comprise two, three, or even more than three aromatic polyimides (P1).

The Polyarylene (P2)

For the purpose of the present invention, an arylene group is a hydrocarbon divalent group consisting of one core composed of one benzenic ring or of a plurality of benzenic rings fused together by sharing two or more neighboring ring carbon atoms, and of two ends.

Non limitative examples of arylene groups are phenylenes, naphthylenes, anthrylenes, phenanthrylenes, tetracenylenes, triphenylylenes, pyrenylenes, and perylenylenes. The arylene groups (especially the numbering of the ring carbon atoms)

were named in accordance with the recommendations of the CRC Handbook of Chemistry and Physics, 64$^{th}$ edition, pages C1-C44, especially p. C11-C12.

Arylene groups present usually a certain level of aromaticity; for this reason, they are often reported as "aromatic" groups. The level of aromaticity of the arylene groups depends on the nature of the arylene group; as thoroughly explained in Chem. Rev. 2003, 103, 3449-3605, "Aromaticity of Polycyclic Conjugated Hydrocarbons", the level of aromaticity of a polycyclic aromatic hydrocarbon can be notably quantified by the "index of benzene character" B, as defined on p. 3531 of the same paper; values of B for a large set of polycyclic aromatic hydrocarbon are reported on table 40, same page.

An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group. An end of an arylene group, or more precisely the linkage capable of being formed by said end, can be characterized by a direction and by a sense; to the purpose of the present invention, the sense of the end of an arylene group is defined as going from the inside of the core of the arylene group to the outside of said core. As concerns more precisely arylene groups the ends of which have the same direction, such ends can be either of the same or opposite sense; also, their ends can be in the straight foregoing of each other, or not (otherwise said, they can be disjoint).

The polyarylene (P2) is any polymer, other than the aromatic polyimide (P1) as above defined, of which more than 50 wt. % of the recurring units are recurring units (R2), wherein:
the recurring units (R2) are of one or more formulae consisting of an optionally substituted arylene group, and
the optionally substituted arylene groups of which the recurring units (R2) consist, are linked by each of their two ends to two other optionally substituted arylene groups via a direct C—C linkage.

That the optionally substituted arylene groups are linked by each of their two ends to two other optionally substituted arylene groups via a direct C—C linkage, is an essential feature of the recurring units (R2); thus, if present in the polyarylene (P2), arylene recurring units which are linked by at least one of their two ends to a group other than an arylene group such as phenylene recurring units $\phi_1$, $\phi_2$ and $\phi_{2'}$, below:

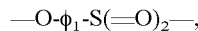—O-$\phi_1$-S(=O)$_2$—,

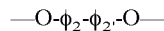—O-$\phi_2$-$\phi_{2'}$-O— are not recurring units (R2) in the sense of the present invention.

The optionally substituted arylene groups of which the recurring units (R2) consist, whatever they are rigid rod-forming arylene units (R2a) or kink-forming arylene units (R2b), can be unsubstituted. Alternatively, part of or all the optionally substituted arylene groups of which the recurring units (R2) consist, can be substituted by at least one monovalent substituting group.

The monovalent substituting group is usually not polymeric in nature; its molecular weight is preferably below 500, more preferably below 300, still more preferably below 200 and most preferably below 150.

The monovalent substituting group is advantageously a solubilizing group. A solubilizing group is one increasing the solubility of the polyarylene (P2) in at least one organic solvent, in particular in at least one of dimethylformamide, N-methylpyrrolidinone, hexamethylphosphoric triamide, benzene, tetrahydrofuran and dimethoxyethane, which can be used as solvents during the synthesis of the polyarylene (P2) by a solution polymerization process.

The monovalent substituting group is also advantageously a group which increases the fusibility of the polyarylene (P2), i.e. lowers its glass transition temperature and its melt viscosity.

Preferably, the monovalent substituting group is chosen from:
hydrocarbyls such as alkyls, aryls, alkylaryls and aralkyls;
halogenos such as —Cl, —Br, —F and —I;
hydrocarbyl groups partially or completely substituted by at least one halogen atom such as halogenoalkyls, halogenoaryls, halogenoalkylaryls and halogenoaralkyls;
hydroxyl;
hydrocarbyl groups substituted by at least one hydroxyl group, such as hydroxyalkyls, hydroxyaryls, hydroxyalkylaryls and hydroxyaralkyls;
hydrocarbyloxys [—O—R, where R is a hydrocarbyl group], such as alkoxys, aryloxys, alkylaryloxys and aralkyloxys;
amino (—NH$_2$);
hydrocarbyl groups substituted by at least one amino group, such as aminoalkyls and aminoaryls;
hydrocarbylamines [—NHR or —NR$_2$, where R is a hydrocarbyl group] such as alkylamines and arylamines;
carboxylic acids and their metal or ammonium salts, carboxylic acid halides, carboxylic anhydrides;
hydrocarbyl groups substituted by at least one of carboxylic acids, metals or ammonium salts thereof, carboxylic acid halides and carboxylic anhydrides, such as —R—C(=O)OH where R is an alkyl or an aryl group;
hydrocarbylesters [—C(=O)OR or —C(=O)R, where R is a hydrocarbyl group] such as alkylesters, arylesters, alkylarylesters and aralkylesters;
amido [—C(=O)NH$_2$];
hydrocarbyl groups substituted by at least one amido group;
hydrocarbylamide monoesters [—C(=O)NHR or —NH—C(=O)—R, where R is a hydrocarbyl group], such as alkylamides, arylamides, alkylarylamides and aralkylamides, and hydrocarbylamide diesters [—C(=O)NR$_2$ or —N—C(=O)R$_2$, where R are a hydrocarbyl groups], such as dialkylamides and diarylamides;
sulfinic acid (—SO$_2$H), sulfonic acid (—SO$_3$H), their metal or ammonium salts,
hydrocarbylsulfones [—S(=O)$_2$—R, where R is the hydrocarbyl group], such as alkylsulfones, arylsulfones, alkylarylsulfones, aralkylsulfones;
aldehyde [—C(=O)H] and haloformyls [—C(=O)X, wherein X is a halogen atom];
hydrocarbylketones [—C(=O)—R, where R is a hydrocarbyl group], such as alkylketones, arylketones, alkylarylketones and aralkylketones;
hydrocarbyloxyhydrocarbylketones [—C(=O)—R$^1$—O—R$^2$, where R$^1$ is a divalent hydrocarbon group such as an alkylene, an arylene, an alkylarylene or an aralkylene, preferably a C$_1$-C$_{18}$ alkylene, a phenylene, a phenylene group substituted by at least one alkyl group, or an alkylene group substituted by at least one phenyl group; and R$^2$ is a hydrocarbyl group, such as an alkyl, aryl, alkylaryl or aralkyl group], such as alkyloxyalkylketones, alkyloxyarylketones, alkyloxyalkylarylketones, alkyloxyaralkylketones, aryloxyalkylketones, aryloxyarylketones, aryloxyalkylarylketones and aryloxyaralkylketones;

any of the above groups comprising at least one hydrocarbyl group or a divalent hydrocarbon group $R^1$, wherein said hydrocarbyl group or said $R^1$ is itself substituted by at least one of the above listed monovalent substituting groups, e.g. an arylketone —C(=O)—R, where R is an aryl group substituted by one hydroxyl group;

where:
  the hydrocarbyl groups contain preferably from 1 and 30 carbon atoms, more preferably from 1 to 12 carbon atoms and still more preferably from 1 to 6 carbon atoms;
  the alkyl groups contain preferably from 1 to 18 carbon atoms, and more preferably from 1 to 6 carbon atoms; very preferably, they are chosen from methyl, ethyl, n-propyl, isopropyl, n-butyl, isobutyl and tert-butyl;
  the aryl groups are defined as monovalent groups consisting of one end and one core composed of one benzenic ring (such the phenyl group) or of a plurality of benzenic rings directly linked to each other via a carbon-carbon linkage (such as the biphenyl group) or fused together by sharing two or more neighboring ring carbon atoms (such as the naphthyl groups), and wherein the ring carbon atoms are possibly substituted by at least one nitrogen, oxygen or sulfur atom; preferably, in the aryl groups, no ring carbon atom is substituted;
  the aryl groups contain preferably from 6 to 30 carbon atoms; more preferably, they are phenyl groups;
  the alkyl group which is contained in the alkylaryl groups meets the preferences of the alkyl groups as above expressed;
  the aryl group which is contained in the aralkyl groups meets the preferences of the aryl groups as above expressed.

More preferably, the monovalent substituting group is chosen from hydrocarbylketones [—C(=O)—R, where R is a hydrocarbyl group] and hydrocarbyloxyhydrocarbylketones [—C(=O)—$R^1$—O—$R^2$, where $R^1$ is a divalent hydrocarbon group and $R^2$ is a hydrocarbyl group], said hydrocarbylketones and hydrocarbyloxyhydrocarbylketones being unsubstituted or substituted by at least one of the above listed monovalent substituting groups.

Still more preferably, the monovalent substituting group is chosen from arylketones and aryloxyarylketones, said arylketones and aryloxyarylketones being unsubstituted or substituted by at least one of the above listed monovalent substituting groups.

Most preferably, the monovalent substituting group is an (unsubstituted) arylketone, in particular it is phenylketone [C(=O)-phenyl].

The core of the optionally substituted arylene group of the recurring units ($R^2$), whatever they are rigid rod-forming arylene units (R2a) or kink-forming arylene units (R2b), is composed of preferably at most 3, more preferably at most 2, and still more preferably at most one benzenic ring. Then, when the core of the optionally substituted arylene group of the recurring units (R2) is composed of one benzenic ring, the recurring units (R2) consist of an optionally substituted phenylene group, provided said optionally substituted phenylene group is linked by each of its two ends to two other optionally substituted arylene groups via a direct C—C linkage.

As above explained, the optionally substituted arylene group of the recurring units (R2) is linked by each of its two ends to two other optionally substituted arylene groups via a direct C—C linkage. Preferably, it is linked by each of its two ends to two other optionally substituted phenylene groups via a direct C—C linkage.

Whenever meaningful, all the above expressed definitions and preferences, whatever their concern and whatever the level of preference expressed, can be applied independently from each other to the rigid rod-forming arylene recurring units (R2a) and to the kink-forming arylene recurring units (R2b).

As also above explained, both ends of the optionally substituted arylene group of the recurring units (R2) can be characterized notably by a direction and by a sense.

A first set of recurring units (R2) contained in the mix (M), is composed of optionally substituted arylene groups, the ends of which
  have the same direction,
  are of opposite sense, and
  are in the straight foregoing of each other

[rigid rod-forming arylene units (R2a)].

More precisely, the mix (M) comprises between 0 and 75 mole %, based on the total number of moles of recurring units (R2), of rigid rod-forming arylene units (R2a), which are optionally substituted by at least one monovalent substituting group.

Non limitative examples of such optionally substituted arylene groups include:

| | |
|---|---|
| 1,4-phenylene (also named p-phenylene) | 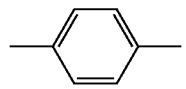 |
| 1,4-naphthylene | 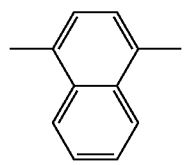 |

-continued
1,4-phenanthrylene and 2,7-phenanthrylene
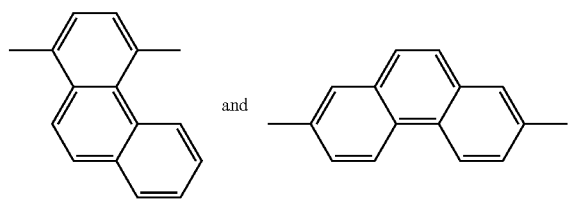
1,4-anthrylene and 9,10-anthrylene
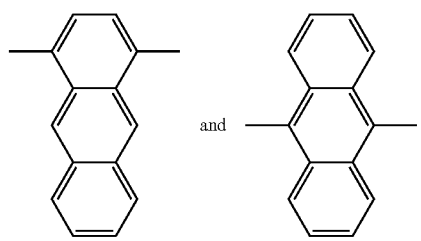
2,7-pyrenylene
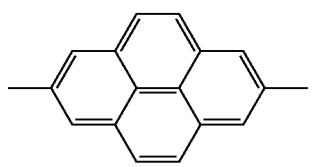
1,4-naphthacenylene and 5,12-naphthacenylene
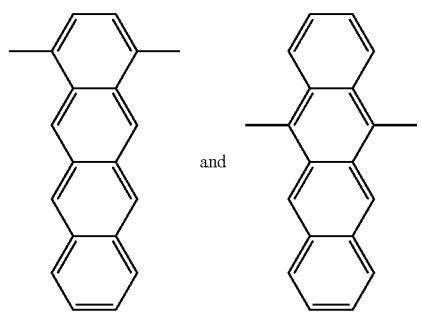
1,4-chrysenylene
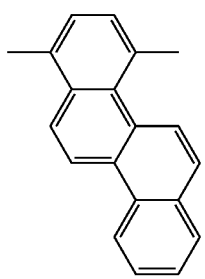

-continued
1,4-triphenylylene and
2,7-triphenylylene
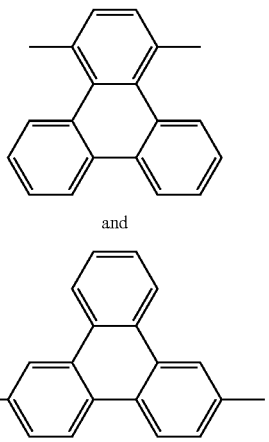
and
1,4-pentacenylene,
5,14-pentacenylene and 6,13-
pentacenylene
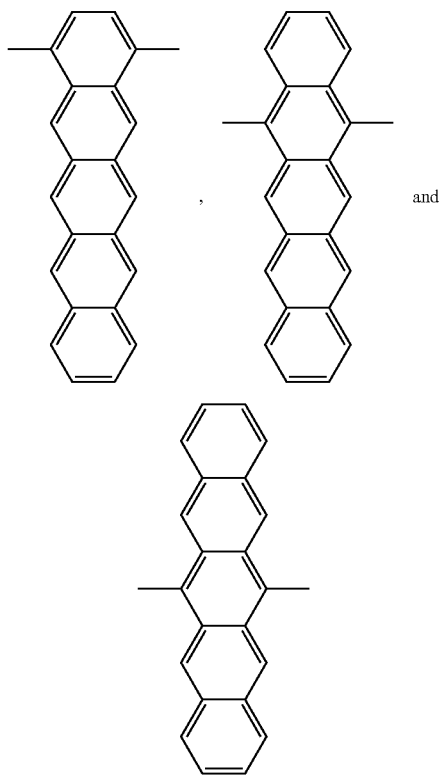
and
1,6-coronenylene
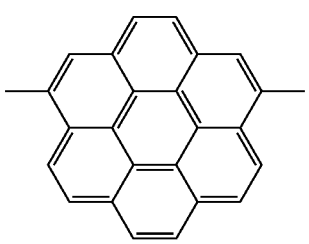

1,4-trinaphthylenylene,
2,9-trinaphthylenylene and
5,18-trinaphthylenylene

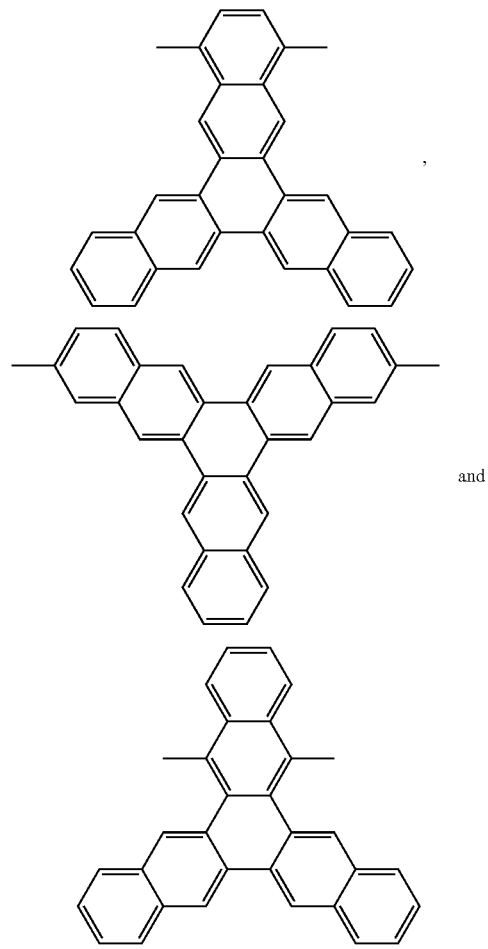

and and any of these groups substituted by at least one monovalent substituting group, as above defined, in particular by a phenylketone group.

Optionally substituted p-phenylenes are preferred as rigid rod-forming arylene units (R2a).

Generally speaking, rigid rod-forming arylene units, when contained in a polyarylene, result in straight polymer chains exhibiting an outstanding rigidity. For this reason, such polyarylenes are commonly referred to as "rigid-rod polymers". The polyarylene (P2), as it contains rigid rod-forming arylene units (R2a), can be qualified as a rigid-rod polyarylene.

A second set of recurring units (R2) contained in the mix (M), is composed of optionally substituted arylene groups, the ends of which
either have a different direction, forming thus together an angle between 0 and 180°, said angle being possibly acute or obtuse,—or have the same direction and the same sense, or have the same direction, are of opposite sense and are disjoint (i.e. not in the straight foregoing of each other) [globally hereafter referred to as kink-forming arylene units (R2b)].

More precisely, the mix (M) comprises between 25 and 100 mole %, based on the total number of moles of recurring units (R2), of kink-forming arylene units (R2b), which are optionally substituted by at least one monovalent substituting group.

A first subset of possible kink-forming arylene units (R2b) is composed of optionally substituted arylene groups, the ends of which have a different direction, forming together an acute angle [kink-forming arylene units (R2b-1)]. Non limitative examples of optionally substituted arylene groups the ends of which have a direction different from each other include:

| | |
|---|---|
| 1,2-phenylene (or o-phenylene) | 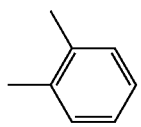 |
| 1,2-, 2,3- and 1,7-naphtylenes | 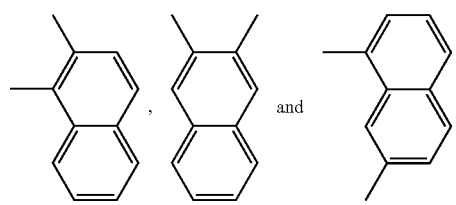 |
| 1,2-, 1,8-, 1,9-, 2,3-, 2,5- and 2,10-phenanthrylenes | 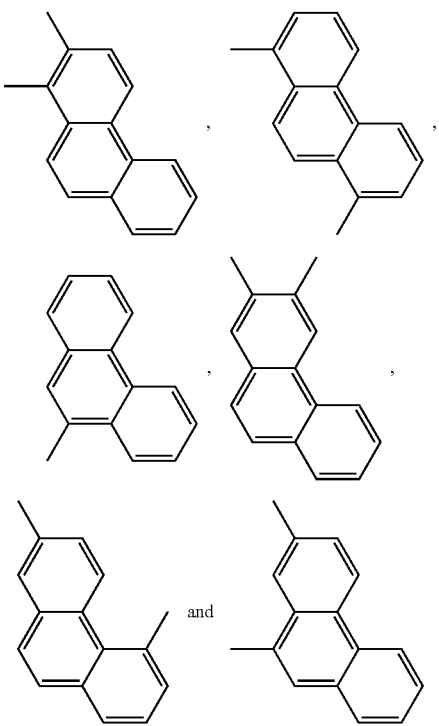 |
| 1,2- and 1,7-anthrylenes | 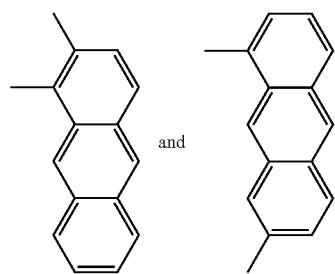 | and any of these groups substituted by at least one monovalent substituting group, as above defined, in particular by a phenylketone group.

A second subset of possible kink-forming arylene units (R2b) is composed of optionally substituted arylene groups, the ends of which have a different direction, forming together an obtuse angle [kink-forming units (R2b-2)]. Non limitative examples of optionally substituted arylene groups the ends of which have a direction different from each other include:

and any of these groups substituted by at least one monovalent substituting group, as above defined, in particular by a phenylketone group.

A third subset of possible kink-forming arylene units (R2b) is composed of optionally substituted arylene groups, the ends of which have the same direction and the same sense [kink-forming arylene units (R2b-3)]. Non limitative examples of optionally substituted arylene groups the ends of which the same direction and the same sense include:

1,3-phenylene (or m-phenylene)

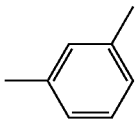

1,3- and 1,6-naphtylenes

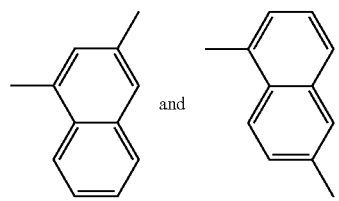

1,3-, 1,5-, 1,7-, 2,4-, 2,9- and 3,10- phenanthrylenes

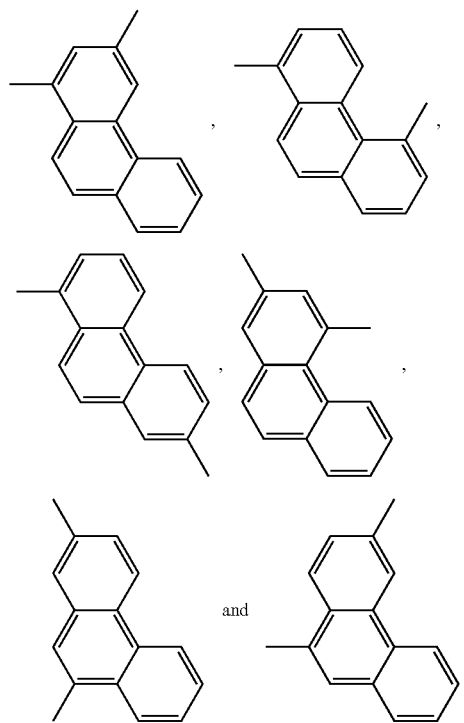

1,3- and 1,6-anthrylenes

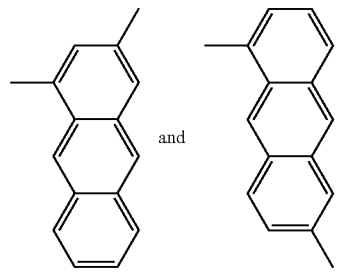

| | |
|---|---|
| 1,8-naphthylene | 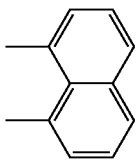 |
| 1,10- and 3,5-phenanthrylenes | 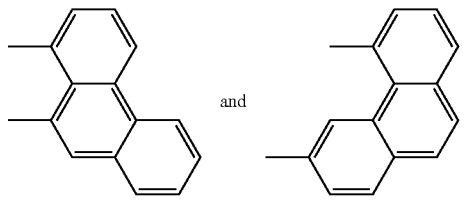 |
| 1,8- and 1,9-anthrylenes | 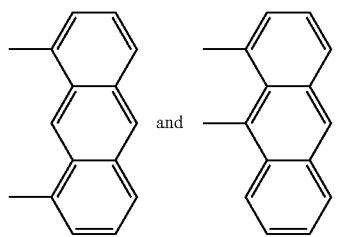 | and any of these groups substituted by at least one monovalent substituting group, as above defined, in particular by a phenylketone group.

A fourth subset of possible kink-forming arylene units (R2b) is composed of optionally substituted arylene groups, the ends of which have the same direction, are of opposite sense and are disjoint [kink-forming arylene units (R2b-4)]. Non limitative examples of such optionally substituted arylene groups include:

| | |
|---|---|
| 1,5- and 2,6-naphtylenes | 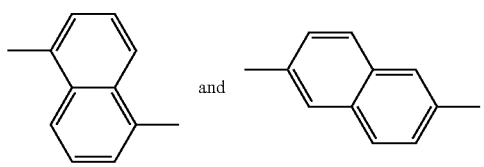 |
| 1,6-, 3,9- and 4,10-phenanthrylenes | 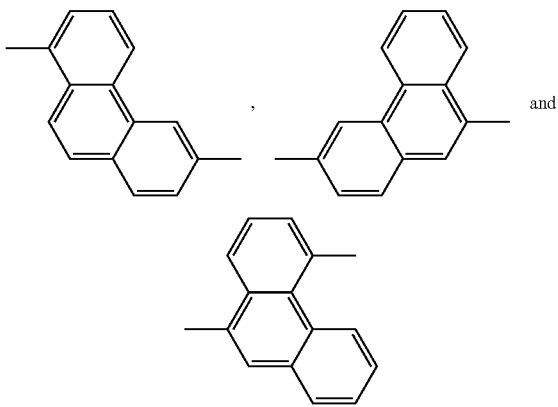 |

| | |
|---|---|
| 1,5-, 1,10- and 2,6-anthrylenes | 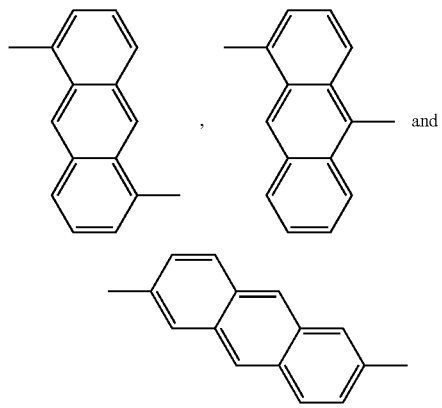 | and any of these groups substituted by at least one monovalent substituting group, as above defined, in particular by a phenylketone group.

Preferably, the kink-forming arylene units (R2b) are chosen from kink-forming arylene units (R2b-1), kink-forming arylene units (R2b-2) and kink-forming arylene units (R2b-4). More preferably, the kink-forming arylene units (R2b) are chosen from kink-forming arylene units (R2b-1) and kink-forming arylene units (R2b-2). Still more preferably, the kink-forming arylene units (R2b) are chosen from kink-forming arylene units (R2b-1). Even still more preferably, the kink-forming arylene units (R2b) are optionally substituted m-phenylenes.

Generally speaking, kink-forming arylene units, when contained in a polyarylene, result in more or less kinked polymer chains, exhibiting a higher solubility and fusibility than straight polymer chains. The polyarylene (P2), as it contains kink-forming arylene units (R2b), can also be qualified as a "kinked polymer".

In the mix (M), the number of moles of the kink-forming arylene units (R2b), based on the total number of moles of the recurring units (R2), is preferably of at least 30%, more preferably at least 35%, still more preferably at least 40% and most preferably at least 45%. On the other hand, in the mix (M), the number of moles of the kink-forming arylene units (R2b), based on the total number of moles of the recurring units (R2), is preferably of at most 90%, more preferably at most 75%, still more preferably at most 65% and most preferably at most 55%.

The recurring units (R2) of the polyarylene (P2) are preferably a mix $(M)=(M^{1\Phi})$ consisting of:

between 0 and 75 mole %, based on the total number of moles of recurring units (R2), of rigid rod-forming arylene units (R2a) chosen from p-phenylenes optionally substituted by at least one monovalent substituting group, with between 25 and 100 mole %, based on the total number of moles of recurring units (R2), of kink-forming arylene units (R2b) chosen from (i) m-phenylenes optionally substituted by at least one monovalent substituting group and (ii) mixes of o-phenylenes with o-phenylenes, wherein both m-phenylenes and o-phenylenes are, independently from each other, optionally substituted by at least one monovalent substituting group.

Preferably, essentially all, if not all, the rigid rod-forming arylene units (R2a) of the mix $(M)=(M^{1\Phi})$ are p-phenylene units substituted by at least one monovalent substituting group. More preferably, essentially all, if not all, the rigid rod-forming arylene units (R2a) of the mix $(M)=(M^{1\Phi})$ are p-phenylenes substituted by at least one monovalent substituting group chosen from hydrocarbylketones [—C(=O)—R, where R is a hydrocarbyl group] and hydrocarbyloxyhydrocarbylketones [—C(=O)—$R^1$—O—$R^2$, where $R^1$ is a divalent hydrocarbon group and $R^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the rigid rod-forming arylene units (R2a) of the $(M)=(M^{1\Phi})$ are p-phenylenes substituted by at least one monovalent substituting group chosen from arylketones and aryloxyarylketones, said arylketones and aryloxyarylketones being unsubstituted or substituted by at least one monovalent substituting group as those above listed. Most preferably, essentially all, if not all, the rigid rod-forming arylene units (R2a) of the $(M)=(M^{1\Phi})$ are p-phenylenes substituted by an arylketone group, in particular by the phenylketone group.

Essentially all, if not all, the kink-forming arylene units (R2b) of the mix $(M)=(M^{1\Phi})$ are m-phenylene units optionally substituted by at least one substituting group. More preferably, essentially all, if not all, the kink-forming arylene units (R2b) of the mix $(M)=(M^{1\Phi})$ are m-phenylene units which are optionally substituted by at least one monovalent substituting group chosen from hydrocarbylketones [—C(=O)—R, where R is a hydrocarbyl group] and hydrocarbyloxyhydrocarbylketones [—C(=O)—R'—O—$R^2$, where $R^1$ is a divalent hydrocarbon group and $R^2$ is a hydrocarbyl group], said hydrocarbylketones and hydrocarbyloxyhydrocarbylketones being themselves unsubstituted or substituted by at least one monovalent substituting group as those above listed. Still more preferably, essentially all, if not all, the kink-forming arylene units (R2b) of the $(M)=(M^{1\Phi})$ are unsubstituted m-phenylene units.

In the mix $(M)=(M^{1\Phi})$, the number of moles of the kink-forming arylene units (R2b), based on the total number of moles of the recurring units (R2), is preferably of at least 30%, more preferably at least 35%, still more preferably at least 40% and most preferably at least 45%. On the other hand, in the mix (M), the number of moles of the kink-forming arylene units (R2b), based on the total number of moles of the recurring units (R2), is preferably of at most 90%, more preferably at most 75%, still more preferably at most 65% and most preferably at most 55%.

Good results were obtained when the recurring units (R2) were a mix (M)=(M$^{1\Phi}$) consisting of p-phenylene units substituted by a phenylketone group with unsubstituted m-phenylene units, in a mole ratio of about 50:50.

The polyarylene (P2) may further comprise recurring units (R2*), different from recurring units (R2).

Recurring units (R2*) may contain or not at least one strong divalent electron withdrawing group linked on each of its ends to an arylene group. Non limitative examples of recurring units (R2*) free of such strong divalent electron withdrawing group are:

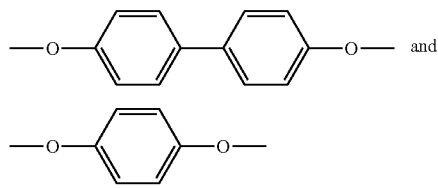

Recurring units (R2*) contain preferably at least one strong divalent electron withdrawing group linked on each of its ends to an arylene group, in particular a p-phenylene group. The divalent electron withdrawing group is preferably chosen from the sulfone group [—S(=O)$_2$—], the carbonyl group [—C(=O)—], the vinylene group [—CH=CH—], the sulfoxide group [—S(=O)—], the azo group [—N=N—], saturated fluorocarbon groups like —C(CF$_3$)$_2$—, organic phosphine oxide groups [—P(=O)(=R$_h$)—, where R$_h$ is a hydrocarbyl group] and the ethylidene group [—C(=CA$_2$)-, where A can be hydrogen or halogen]. More preferably, the divalent electron withdrawing group is chosen from the sulfone group and the carbonyl group. Still more preferably, recurring units (R2*) are chosen from:

(i) recurring units of formula:

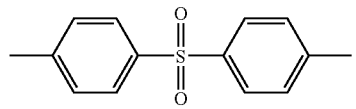

(ii) recurring units of formula:

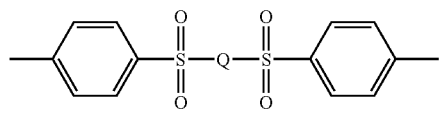

wherein Q is a group chosen from:

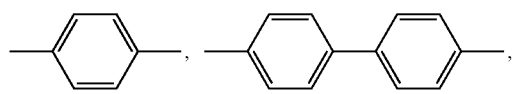

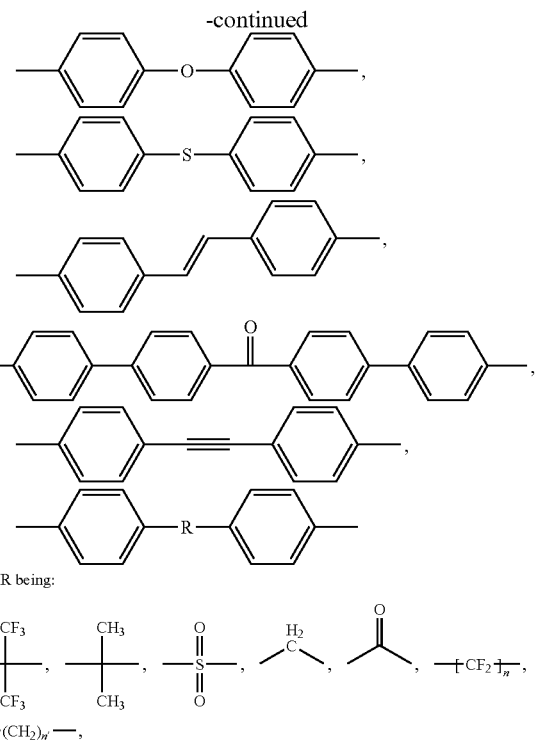

with R being:

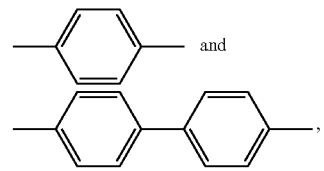

with n being an integer from 1 to 6 and n' being an integer from 2 to 6, Q being preferably chosen from

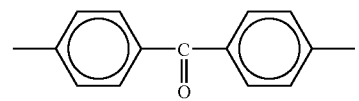

(iii) recurring units of formula

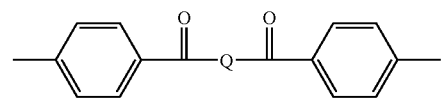

(iv) recurring units of formula with Q as above defined for recurring units (ii).

Preferably more than 75 wt. % and more preferably more than 90 wt. % of the recurring units of the polyarylene (P2) are recurring units (R2). Still more preferably, essentially all, if not all, the recurring units of the polyarylene (P2) are recurring units (R2).

Excellent results were obtained when the polyarylene (P2) was a kinked rigid-rod polyphenylene copolymer, essentially all, if not all, the recurring units of which consisted of a mix of p-phenylene substituted by a phenylketone group with unsubstituted m-phenylene in a mole ratio p-phenylene:m-phenylene of from 10:90 to 70:30, preferably of from 25:75 to 65:35, more preferably of from 35:65 to 60:40, still more preferably of from 45:55 to 55:45, and most preferably of about 50:50. Such a kinked rigid-rod polyphenylene copolymer is commercially available from Solvay Advanced Polymers, L.L.C. as PRIMOSPIRE™ PR-250 polyphenylene.

The polyarylene (P2) has usually a number average molecular weight greater than 1000, preferably greater than 5000, more preferably greater than about 10000 and still more preferably greater than 15000. On the other hand, the number average molecular weight of the polyarylene (P2) is usually below 100000, and preferably below 70000. In a certain embodiment, the number average molecular weight of the polyarylene (P2) is above 35000. In another embodiment, it is of at most 35000; in this embodiment, it is often of at most 25000 and sometimes of at most 20000. The number average molecular weight of a polyarylene, in particular that of the polyarylene (P2), is advantageously determined by: (1) measuring a "relative" number average molecular weight of the polyarylene by Gel Permeation Chromatography (GPC) using polystyrene calibration standards, then (2) dividing the so-measured "relative" number average molecular weight by a factor 2. It is proceeded accordingly because the skilled in the art who is a specialist of polyarylenes knows that their "relative" number average molecular weight, as measured by GPC, are generally off by a factor of about 2 times; it has already been accounted for this correction factor in all the above cited lower and upper limits of molecular weight.

The polyarylene (P2) can be amorphous (i.e. it has no melting point) or semi-crystalline (i.e. it has a melting point). It is preferably amorphous.

The polyarylene (P2) has a glass transition temperature of advantageously above 50° C., preferably above 120° C. and more preferably above 150° C.

The polyarylene (P2) can be prepared by any method. Methods well known in the art to prepare the polyarylene (P2) are described notably in U.S. Pat. Nos. 5,227,457; 5,539,048; 5,565,543; 5,646,231; 5,654,392; 5,659,005; 5,668,245; 5,670,564; 5,721,335; 5,756,581; 5,760,131; 5,824,744; 5,827,927; 5,869,592; 5,886,130; and 6,087,467, the whole content of which is incorporated herein by reference. A suitable method for preparing the polyarylene (P2) comprises polymerizing, preferably by reductive coupling, (i) at least one dihaloarylene molecular compound consisting of an optionally substituted rigid rod-forming arylene group, which is linked on each of its two ends to one halogen atom, such as chlorine, bromine and iodine, with (ii) at least one dihaloarylene molecular compound consisting of an optionally substituted kink-forming arylene group, which is linked on each of its two ends to one halogen atom, such as chlorine, bromine, iodine, and fluorine. The elimination of the halogen atoms from the dihaloarylene molecular compounds results in the formation of respectively optionally substituted rigid rod-forming and optionally substituted kink-forming arylene groups.

Thus, for example:
the elimination of both chlorine atoms from a molecule of p-dichlorobenzene, p-dichlorobiphenyl or their homologous of general formula Cl-$(\phi)_N$-Cl, N being an integer from 3 to 10, results in the formation of respectively 1, 2 or N adjacent p-phenylene units (rigid rod-forming arylene units); thus, p-dichlorobenzene, p-dichlorobi- phenyl and their homologous of general formula Cl-$(\phi)_N$-Cl, N as above defined, can be polymerized, so as to form p-phenylene units;

2,5-dichlorobenzophenone (p-dichlorobenzophenone) can be polymerized, so as to form 1,4-(benzoylphenylene) units (also rigid rod-forming arylene units);

m-dichlorobenzene can be polymerized, so as to form m-phenylene units (kink-forming arylene units).

The blend (B) can comprise one and only one polyarylene (P2). Alternatively, it can comprise two, three, or even more than three polyarylenes (P2).

In the blend (B), the polyarylene (P2) can be in any form. Generally, the polyarylene (P2) is in a form other than fibers.

Preferably, the polyarylene (P2) is in at least one out of the two following forms:
polyarylene (P2) solubilized in a phase comprising aromatic polyimide (P1), possibly the matrix phase of the blend (B);
polyarylene (P2) forming a dispersing phase, possibly the matrix phase of the blend (B), said dispersing phase comprising, dispersed therein, aromatic polyimide (P1) at solubilized state;

and, possibly in addition, in one or more of the following forms:
nodules of polyarylene (P2) dispersed in a phase comprising aromatic polyimide (P1), possibly the matrix phase of the blend (B);
polyarylene (P2) forming a dispersing phase, possibly the matrix phase of the blend (B), said dispersing phase comprising, dispersed therein, nodules of aromatic polyimide (P1).

Very preferably, the polyarylene (P2) is in the form of:
polyarylene (P2) solubilized in a phase comprising aromatic polyimide (P1), possibly the matrix phase of the blend (B);

and, possibly in addition, in the form of:
nodules of polyarylene (P2) dispersed in a phase comprising aromatic polyimide (P1), possibly the matrix phase of the blend (B);

wherein:
certain nodules of polyarylene (P2) may be free of aromatic polyimide (P1), and
certain other nodules of polyarylene (P2) may form themselves a dispersing phase, other than the matrix phase, comprising, dispersed therein, aromatic polyimide (P1) at solubilized state and/or in the form of sub-nodules.

Optional Ingredients of the Blend (B)

The blend (B) may further contain a variety of other polymers, additives, fillers, and the like, collectively called ingredients. Conventional ingredients of aromatic polyimide and polyarylene compositions include fibrous reinforcing agents, particulate fillers and nucleating agents such as talc and silica, adhesion promoters, compatibilizers, curing agents, lubricants, metal particles, mold release agents, organic and/or inorganic pigments like $TiO_2$ and carbon black, dyes, flame retardants, smoke-suppressing agents, heat stabilizers, antioxidants, UV absorbers, tougheners such as rubbers, plasticizers, anti-static agents, melt viscosity depressants such as liquid crystalline polymers and the like.

In general, the weight of said optional ingredients, based on the total weight of the blend (B), is advantageously below 75%, preferably below 50%, more preferably below 25% and still more preferably below 10%. Excellent results were obtained when the blend (B) was essentially free, or even was completely free, of said optional ingredients.

In a particular embodiment, the blend (B) may further contain a fibrous reinforcing agent, especially an inorganic fibrous reinforcing agent such as glass fiber and carbon fiber. Thus, in said particular embodiment, the blend (B) comprises from 10 to 50 wt. %, in particular from 20 to 30 wt. %, of a reinforcing agent (all percentages based on the total weight of the blend); an example of such a blend is one composed of 35 wt. % of a kinked rigid-rod polyphenylene copolymer, 35 wt. % of an aromatic polyetherimide homopolymer and 30 wt. % of glass fiber.

The Preparation of the Invented Blend

The blend (B) can be prepared by any method.

An aspect of the present invention is directed to a method for preparing the blend (B) as above described which comprises melt mixing at least one aromatic polyimide (P1) with at least one polyarylene (P2).

The melt mixing of the aromatic polyimide (P1) with the polyarylene (P2) can be achieved by any appropriate means. The melt mixing is advantageously made under a sufficiently high shear, so as to achieve a high degree of mixing of both polymers in the blend (B) ("shear-mixing"). The melt mixing can notably be achieved in a desirable manner by extruding the aromatic polyimide (P1) with the polyarylene (P2), so as to obtained strands of the blend (B). Very preferably, the so-obtained strands are then chopped into pellets.

The invented method preferably further comprises the step of dry mixing the aromatic polyimide (P1) with the polyarylene (P2), both preferably in powder or in granular form, prior to the melt mixing step.

End Uses of the Invented Blend

As previously mentioned, another aspect of the present invention is directed to a shaped article or a part of a shaped article comprising the blend (B) as above described.

Non limitative examples of shaped articles or part of shaped articles in accordance with the present invention include:

Films

Many different methods may be used to form films. Either continuous or batch processes may be used.

Films may be formed from solution. The solution comprises generally an organic liquid (solvent), which dissolves advantageously the aromatic polyimide (P1) and the polyarylene (P2).

Films may also be formed from the melt of the blend (B). Films may be extruded through a slit. Films may be formed by blow extrusion.

Films may also be further processed by stretching and/or annealing. Special films such as bilayers, laminates, porous films, textured films and the like may be produced by techniques known in the art.

Films comprising the blend (B) may be oriented by stretching. Stretching along one dimension will result in uniaxial orientation. Stretching in two dimensions will give biaxial orientation. Stretching may be aided by heating near the glass transition temperature. Stretching may also be aided by plasticizers. More complex processes such as applying alternating cycles of stretching and annealing may also be used with the blends of the present invention.

Fibers

Fibers comprising the blend (B) may be formed by known techniques. They may be formed notably from solution, or from the melt of the blend (B).

Coatings

In contrast with films which are generally uncoated, coatings are usually coated on a substrate. The expression "coated on a substrate" should be understood in its common sense, i.e. that the coating forms a cover over the surface of a substrate, thereby without including any limitation as to the process used to achieve the coating. The surface of the substrate may be partly or completely covered by the coating.

The thickness of the coating is usually of at least 1 μm, preferably of at least 5 μm, more preferably of at least 10 μm, and still more preferably of at least 20 μm. Besides, the thickness of the coating is usually of at most 10000 μm, preferably of at most 1000 μm, more preferably of at most 500 μm. In certain embodiments, the thickness of the coating may be of no more than 200 μm, and even non more than 100 μm.

Coatings may be formed by known techniques, including but not limited to, powder coating, laminating preformed films, coating from solution or from the melt, and like methods.

An aspect of the present invention is an article comprising a substrate, onto which the coating as above described is coated.

A particular aspect of the present invention of particularly high technical interest is directed to the use of the coating as above described, for ablative insulation. Accordingly, the coating is coated on a substrate such as a metal, and the coating is submitted to an aggressive agent which destroys partly or completely the coating; the coating is then used as a "sacrificed" layer, to protect the substrate against the aggressive agent. A first type of aggressive agent is a body which is in relative motion with regard to the coating and rubs against it; the body is usually more abrasive than the coating itself. Another type of aggressive agent lies in flames, which may originate from uncontrolled or controlled fires, in particular from the deliberate combustion of fuels. Still another type of aggressive agent is chosen from chemicals. Combinations of these different types of aggressive agents are also encompassed.

Membranes

The blend (B) may be fabricated into membranes useful for separations of mixed gases, liquids and solids.

Other Shaped Articles or Parts of Shaped Articles

The blend (B) may also be fabricated into sheets, and various three-dimensional shaped articles and parts of shaped articles.

Various molding techniques may be used to form shaped articles from blend (B):

Molding Techniques

Powders, pellets, beads, flakes, reground material or other forms of the blend (B) may be molded, with or without liquid or other additives, premixed or fed separately. In particular embodiments, the blend (B) may be compression molded. Exact conditions may be determined by trial and error molding of small samples. Upper temperature limits may be estimated from thermal analysis such as thermogravimetric analysis. Lower temperature limits may be estimated from Tg as measured for example by dynamic mechanical thermal analysis (DMTA), differential scanning calorimetry (DSC), or like methods. The blend (B) can be injection molded. It is also desirable if the blend (B) can be remelted several times without degradation, so that regrind from molding processes can be used. One skilled in the art will recognize that other factors also influence injection moldability including the material's stress relaxation properties and the temperature dependence of melt viscosity.

Extrusion Techniques

The blend (B) can also be extruded. Non-limiting examples include angle, channel, hexagonal bar, hollow bar, 1-beam, joining strip, tubes, rectangular tube, rod, sheet, plate, square bar, square tube, T-section, thin-walled tubes, microtubes, strands, rectangular strands, or other shapes as is required for a particular application. Related to extrusion is pultrusion, wherein a fiber reinforcement, such as glass or carbon fiber, is continuously added to a matrix of extruded blend (B) at molten state; composites with exceptional moduli and compressive strength will result.

Thermoforming

Sheet stock may be cut, stamped, welded, or thermally formed. For example, printed wiring boards may be fabricated from sheet or thick films by a process wherein copper is deposited on to one or both sides, patterned by standard photolithographic methods, etched, then holes are drilled, and several such sheets laminated together to form a finished board. Sheet and film may also be thermoformed into any variety of housings, cabinets, containers, covers, chassis, plates, panels, fenders, hoods, and the like.

The Unexpected Merits of the Invention

In spite of substantial discrepancies in their molecular structure, the polyarylene (P2) and the aromatic polyimide (P1) contained in the blend (B) exhibit good compatibility with each other, in substantial progress when compared to the prior art aromatic polyimide-polyarylene blends; they are in general at least partially miscible with each other, the miscible portion of both polymers forming then a single phase [(P2) being solubilized in (P1) or the contrary, depending on the relative amounts of both polymers].

Also surprisingly, the blend (B) exhibits an excellent balance of properties, including:

a very high strength, higher than that of prior art neat aromatic polyimides;
  a very high stiffness, higher than that of prior art neat aromatic polyimides;
  a high fire resistance, higher than that of prior art neat aromatic polyimides and aromatic polyimide-polyarylene blends, which results notably in a reduced heat release rate and/or reduced smoke generation.
  good elongation properties, in progress with regard to those of the prior art aromatic polyimide-polyarylene blends;
  a high impact resistance, as characterized by a standard notched IZOD test (ASTM D-256) and a standard DYNATUP® test (ASTM-D3763), higher than that of the prior art aromatic polyimide-polyarylene blends, which approaches or even exceeds by certain aspects that of the neat aromatic polyimides; and
  a good melt processability, in substantial progress when compared to that of the prior art aromatic polyimide-polyarylene blends.

Various modifications to the embodiments described in the present document will be readily apparent to those skilled in the art, and the generic principles defined herein may be applied to other embodiments without departing from the spirit and scope of the invention; thus, this invention is also not intended to be limited to all the embodiments shown, but is to be accorded the widest scope consistent with the principles and features disclosed herein.

EXAMPLES

The present invention is described in greater detail below by referring to the examples; however, the present invention is not limited to these examples.

The polymers that were used are:

a polyetherimide homopolymer ULTEM® 1000, commercially available from General Electric,
  a polyphenylene copolymer essentially all, if not all, the recurring units of which consisted of a mix of p-phenylene substituted by a phenylketone group with unsubstituted m-phenylene in a mole ratio p-phenylene:m-phenylene of about 85:15, commercially available from Solvay Advanced Polymers, L.L.C. as PRIMOSPIRE™ PR-120 polyphenylene, and a polyphenylene copolymer essentially all, if not all, the recurring units of which consisted of a mix of p-phenylene substituted by a phenylketone group with unsubstituted m-phenylene in a mole ratio p-phenylene:m-phenylene of about 50:50, commercially available from Solvay Advanced Polymers, L.L.C. as PRIMOSPIRE™ PR-250 polyphenylene.

The blends according to the present invention [(E1) and (E2)], the comparative blends [(CE1) and (CE2)], as well as the neat polyetherimide control [(CE0)], were compounded on a Berstorff 25 mm twin-screw co-rotating intermeshing extruder. In the case of the neat polyetherimide control (CE0), the compounding step was to convert the resin from powder to pellet form and to impart the same heat history seen by the blends on the base polymer.

First Set of Experimental Results: Glass Transition Temperatures

The glass transition temperatures of the blends and of the control were measured by Differential Scanning Calorimetry. The samples were submitted to the following heating/cooling cycle: $1^{st}$ heating from room temperature (20° C.) up to 250° C. at a rate of 10° C./min, followed by cooling from 250° C. down to room temperature at a rate of 20° C./min, followed by $2^{nd}$ heating from room temperature up to 250° C. at a rate of 10° C./min. The glass transition temperatures were measured during $2^{nd}$ heating. Each glass transition temperature was determined by a certain construction procedure on the heat flow curve: a first tangent line to the curve above the transition region was constructed; a second tangent line to the curve below the transition region was also constructed; the temperature on the curve halfway between the two tangent lines, or ½ delta Cp, was the glass transition temperature.

TABLE 1

| Glass transition temperatures | | | | | |
|---|---|---|---|---|---|
|  | (CE0) | (CE1) | (E1) | (CE2) | (E2) |
| ULTEM ® 1000 polyetherimide | 100 | 90 | 90 | 80 | 80 |
| PRIMOSPIRE ™ PR-120 polyphenylene (parts by weight) | 0 | 10 | 0 | 20 | 0 |
| PRIMOSPIRE ™ PR-250 polyphenylene (parts by weight) | 0 | 0 | 10 | 0 | 20 |
| $1^{st}$ glass transition temperature (° C.) | None | 159.1 | n.d. | 158.8 | 184.6 |
| $2^{nd}$ glass transition temperature (° C.) | 216.7 | 215.2 | 211.4 | 214.0 | 209.2 |

In addition, glass transitions of PRIMOSPIRE™ PR-120 polyphenylene and PRIMOSPIRE™ PR-250 polyphenylene were also measured as 158.2 and 170.2° C., respectively. The significant shifts in glass transition temperature (Tg) of the components of the polyetherimide—PRIMOSPIRE™ PR-250 polyphenylene blend (E2) (+14.4° C.) indicated that there was partial miscibility between these two polymers. This was unexpected behavior, which was very interesting and useful in terms of allowing blends with good compatibility and stable phase morphology. Based on the Fox rule of Tg averaging, the polyetherimide-rich phase was estimated to contain about 15% PRIMOSPIRE™ PR-250 polyphenylene, which explained why blend (E1) showed only one glass transition, and that no PRIMOSPIRE™ PR-250 polyphenylene Tg was detectable ("n.d." for "not detectable"); this proved to be a completely miscible blend.

Second Set of Experimental Results: Mechanical Properties

Mechanical property tests were conducted per the ASTM methods indicated using 3.2 mm-thick ASTM specimens.

The results that were obtained are presented in table 2 below.

TABLE 2

Mechanical Properties.

|  | ASTM Method | (CE0) | (CE1) | (E1) | (CE2) | (E2) |
|---|---|---|---|---|---|---|
| ULTEM ® 1000 polyetherimide |  | 100 | 90 | 90 | 80 | 80 |
| PRIMOSPIRE ™ PR-120 polyphenylene (parts by weight) |  | 0 | 10 | 0 | 20 | 0 |
| PRIMOSPIRE ™ PR-250 polyphenylene (parts by weight) |  | 0 | 0 | 10 | 0 | 20 |
| Strength and stiffness. |  |  |  |  |  |  |
| Tensile strength (psi) | D-638 | 16700 | 17500 | 17400 | 19200 | 18600 |
| Flexural Strength (psi) | D-790 | 21700 | 23200 | 22600 | 25200 | 24400 |
| Tensile Modulus (ksi) | D-638 | 466 | 524 | 502 | 583 | 538 |
| Flexural Modulus (ksi) | D-790 | 509 | 556 | 531 | 613 | 578 |
| Elongation properties. |  |  |  |  |  |  |
| Tensile elongation at yield (%) | D-638 | 7.2 | 6.4 | 6.7 | 5.8 | 6.5 |
| Tensile elongation at break (%) | D-638 | 61 | 30 | 40 | 14 | 23 |
| Impact properties. |  |  |  |  |  |  |
| Notched Izod times 10 (ft-lb/in) | D-256 | 7.0 | 6.3 | 8.4 | 8.2 | 8.6 |
| Penetration impact Dynatup ® test - Total energy absorbed (ft-lb) | D-3763 | 72 | 21 | 23 | 14 | 41 |
| Penetration impact Dynatup ® test - Maximum load (lb) | D-3763 | 2080 | 1230 | 1390 | 1010 | 1970 |

Blends (E1) and (E2) (according to the invention) exhibited an excellent balance of properties, including:

- a very high strength, higher than that of prior art neat polyetherimide (CE0);
- a very high stiffness, higher than that of prior art neat polyetherimide (CE0);
- good elongation properties, in progress when compared to the corresponding comparative PRIMOSPIRE™ PR-120-based blends (CE1) and (CE2), as reflected by the tensile elongation properties; with this regard, (E1) gave the best results;
- a notched IZOD, higher than that of comparative blends (CE1) and (CE2) and even exceeds that of the neat aromatic polyimide (CE0);
- good penetration impact Dynatup® test results, in progress when compared to the corresponding comparative PRIMOSPIRE™ PR-120-based blends (CE1) and (CE2); with this regard, (E2) gave the best results, which approached those obtained with neat polyetherimide (CE0).

Third Set of Experimental Results: Properties Related to Fire Resistance

The fire resistance of neat polyetherimide control (CE0), and the blends including 10 wt. % polyphenylene, i.e. comparative blend (CE1) and blend (E1) according to the invention, was tested using the cone calorimetry method (ASTM E-1354).

The results are shown in table 3.

TABLE 3

Properties related to tire resistance.

|  | ASTM Method | (CE0) | (CE1) | (E1) |
|---|---|---|---|---|
| ULTEM ® 1000 polyetherimide |  | 100 | 90 | 90 |
| PRIMOSPIRE ™ PR-120 polyphenylene (parts by weight) |  | 0 | 10 | 0 |
| PRIMOSPIRE ™ PR-250 polyphenylene (parts by weight) |  | 0 | 0 | 10 |
| Cone calorimetry | E-1354 |  |  |  |
| Peak heat release rate (kW/m$^2$) | D-638 | 255 | 205 | 188 |
| Average heat release rate during first 5 minutes (300 seconds) of sample combustion HRR$_{[300s]}$ (kW/m$^2$) | D-638 | 161 | 151 | 138 |
| Total smoke generated from sample prior to and during flaming combustion S$_A$ (m$^2$/m$^2$) | D-790 | 956 | 751 | 711 |

In an unexpected manner, blend (E1) exhibited a higher fire resistance not only than that of neat polyetherimide (CE0), but also than that of the comparative PRIMOSPIRE™ PR-120-based blend (CE1). In particular, said blend (E1) exhibited a lower heat release, and generated a lower volume of smoke during flaming combustion.

The invention claimed is:

1. A blend (B) comprising:
   at least one aromatic polyimide (P1), and
   at least one polyarylene (P2), more than 50 wt. % of the recurring units thereof are optionally substituted arylene groups [recurring units (R2)], each of said recurring units (R2) being linked by each of its two ends to two other optionally substituted arylene groups via a direct C—C linkage, and said recurring units (R2) being a mix (M) consisting of:
    between 0 and 75 mole %, based on the total number of moles of recurring units (R2), of rigid rod-forming arylene units (R2a), optionally substituted by at least one monovalent substituting group, with
    between 25 and 100 mole %, based on the total number of moles of recurring units (R2), of kink-forming arylene units (R2b), optionally substituted by at least one monovalent substituting group.

2. The blend according to claim 1, wherein the weight of the polyarylene (P2), based on the combined weight of the aromatic polyimide (P1) and the polyarylene (P2), is of at least 5%.

3. The blend according to claim 2, wherein the weight of the polyarylene (P2), based on the combined weight of the aromatic polyimide (P1) and the polyarylene (P2), is of at most 30%.

4. The blend according to claim 1, wherein the combined weight of the aromatic polyimide (P1) and the polyarylene (P2), based on the total weight of the blend (B), is above 95%.

5. The blend according to claim 1, wherein the recurring units (R2) of the polyarylene (P2) are a mix (M) consisting of:
    between 0 and 75 mole %, based on the total number of moles of recurring units (R2), of rigid rod-forming arylene units (R2a) chosen from p-phenylenes optionally substituted by at least one monovalent substituting group,
with
    between 25 and 100 mole %, based on the total number of moles of recurring units (R2), of kink-forming arylene units (R2b) chosen from (i) m-phenylenes optionally substituted by at least one monovalent substituting group and (ii) mixes of m-phenylenes with o-phenylenes, wherein both m-phenylenes and o-phenylenes are, independently from each other, optionally substituted by at least one monovalent substituting group.

6. The blend according to claim 5, wherein the rigid rod-forming arylene units (R2a) of the mix (M) are p-phenylenes substituted by a phenylketone group.

7. The blend according to claim 5, wherein the kink-forming arylene units (R2b) of the mix (M) are unsubstituted m-phenylenes.

8. The blend according to claim 1, wherein, in the mix (M), the number of moles of the kink-forming arylene units (R2b), based on the total number of moles of the recurring units (R2), is of at least 40%.

9. The blend according to claim 1, wherein, in the mix (M), the number of moles of the kink-forming arylene units (R2b), based on the total number of moles of the recurring units (R2), is of at most 65%.

10. The blend according to claim 1, wherein the aromatic polyimide (P1) is an aromatic polyetherimide.

11. The blend according to claim 10, wherein more than 50 wt. % of the recurring units of the aromatic polyimide (P1) are recurring units (R1) chosen from recurring units (R1c-4)

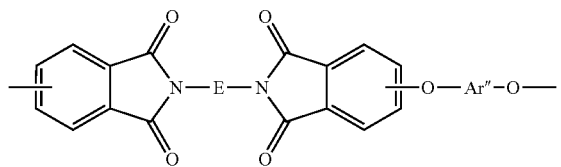

(XXXIII)

as such, and/or in their amic acid forms

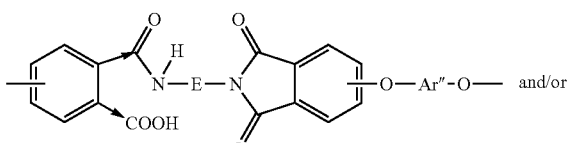

(XXXIV)

and/or

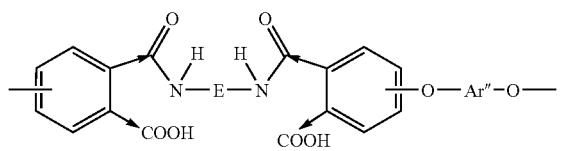

(XXXV)

wherein:
    the → denotes isomerism so that in any recurring unit the groups to which the arrows point may exist as shown or in an interchanged position;
    E is chosen from:
(E-i)

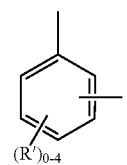

with the R' being, independently from each other, alkyl radicals comprising from 1 to 6 carbon atoms, aryls or halogens;
(E-ii)

with n=integer from 1 to 6;
(E-iii)

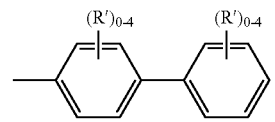

with the R' being, independently from each other, alkyl radicals comprising from 1 to 6 carbon atoms, aryls or halogens;
(E-iv)

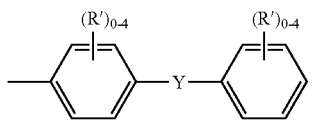

with the R' being, independently from each other, alkyl radicals comprising from 1 to 6 carbon atoms, aryls or halogens; and Y being chosen from:
(Y-i) alkylenes of 1 to 6 carbon atoms, in particular

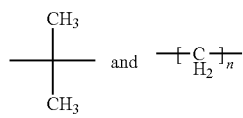

with n=integer from 1 to 6,
(Y-ii) perfluoroalkylenes of 1 to 6 carbon atoms, in particular

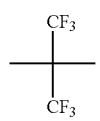

and

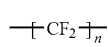

with n=integer from 1 to 6,
(Y-iii) cycloalkylenes of 4 to 8 carbon atoms;
(Y-iv) alkylidenes of 1 to 6 carbon atoms;
(Y-v) cycloalkylidenes of 4 to 8 carbon atoms;

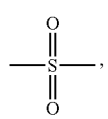 (Y-vi)

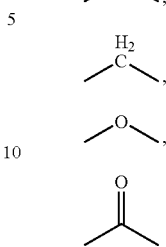

Ar" is selected from:
(Ar"-i) aromatic hydrocarbon radicals having from 6 to 20 carbon atoms and halogenated substituted thereof, or alkyl substituted derivatives thereof, wherein the alkyl substituting group contains 1 to 6 carbon atoms, such as:

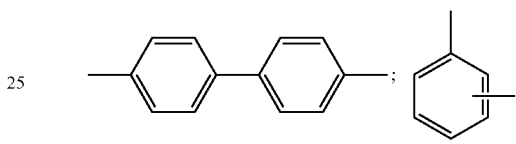

and halogenated substituted thereof, or alkyl substituted derivatives thereof, wherein the alkyl substituting group contains from 1 to 6 carbon atoms;
(Ar"-ii)

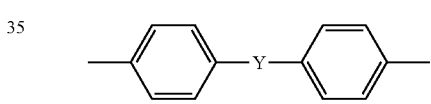

with Y being chosen from (Y-i), (Y-ii), (Y-iii), (Y-iv), (Y-v), (Y-vi), (Y-vii), (Y-viii), (Y-ix) and (Y-x), as above defined,
(Ar"-iii) alkylene and cycloalkylene radicals having from 2 to 20 carbon atoms, and
(Ar"-iv) terminated polydiorganosiloxanes.

12. The blend according to claim 11, wherein more than 50 wt. % of the recurring units of the aromatic polyimide (P1) are recurring units (R1) of formula (XXXVIII) as such, in imide form, and/or in amic acid forms [formulae (XXXIX) and (XL)]:

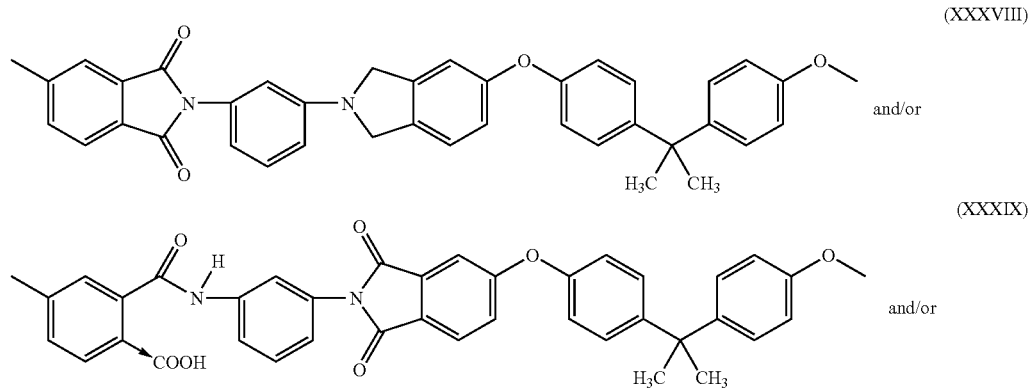

-continued

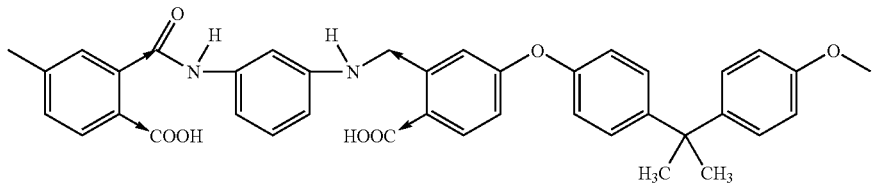
(XL)

wherein in formulae (XXXIX) and (XL) the → denotes isomerism so that in any recurring unit the groups to which the arrows point may exist as shown or in an interchanged position.

13. The blend according to claim 11, wherein essentially all the recurring units of the aromatic polyimide (P1) are recurring units (R1).

14. A method for preparing the blend (B) according to claim 1, said method comprising melt mixing the at least one aromatic polyimide (P1) with the at least one polyarylene (P2).

15. The method according to claim 14, comprising extruding the aromatic polyimide (P1) with the polyarylene (P2), so as to obtain strands of the blend (B).

16. A shaped article or a part of a shaped article comprising the blend according to claim 1.

17. The shaped article or the part of a shaped article according to claim 16, which is selected from a group consisting of films, fibers, coating, and membranes.

18. A process for preparing the shaped article or the part of a shaped article according to claim 16, wherein the blend (B) is injection molded.

19. A method for increasing the fire resistance of an aromatic polyimide (P1) in the need thereof, said method comprising blending said aromatic polyimide (P1) with at least one polyarylene (P2),
wherein more than 50 wt. % of the recurring units of the polyarylene (P2) are optionally substituted arylene groups [recurring units (R2)], each of said recurring units (R2) being linked by each of its two ends to two other optionally substituted arylene groups via a direct C—C linkage, and said recurring units (R2) being a mix (M) consisting of:
between 0 and 75 mole %, based on the total number of moles of recurring units (R2), of rigid rod-forming arylene units (R2a), optionally substituted by at least one monovalent substituting group, with
between 25 and 100 mole %, based on the total number of moles of recurring units (R2), of kink-forming arylene units (R2b), optionally substituted by at least one monovalent substituting group.

20. The method according to claim 19, which is a method for reducing the heat released and/or the smoke generated during the combustion of the aromatic polyimide (P1) in the need thereof.

21. A method for increasing the impact resistance of an aromatic polyimide (P1) in the need thereof, said method comprising blending said aromatic polyimide (P1) with at least one polyarylene (P2),
wherein more than 50 wt. % of the recurring units of the polyarylene (P2) are optionally substituted arylene groups [recurring units (R2)], each of said recurring units (R2) being linked by each of its two ends to two other optionally substituted arylene groups via a direct C—C linkage, and said recurring units (R2) being a mix (M) consisting of:
between 0 and 75 mole %, based on the total number of moles of recurring units (R2), of rigid rod-forming arylene units (R2a), optionally substituted by at least one monovalent substituting group, with
between 25 and 100 mole %, based on the total number of moles of recurring units (R2), of kink-forming arylene units (R2b), optionally substituted by at least one monovalent substituting group.

* * * * *

UNITED STATES PATENT AND TRADEMARK OFFICE
CERTIFICATE OF CORRECTION

PATENT NO. : 7,820,767 B2
APPLICATION NO. : 12/281033
DATED : October 26, 2010
INVENTOR(S) : Mohammad Jamal El-Hibri et al.

Page 1 of 1

It is certified that error appears in the above-identified patent and that said Letters Patent is hereby corrected as shown below:

Column 52, " 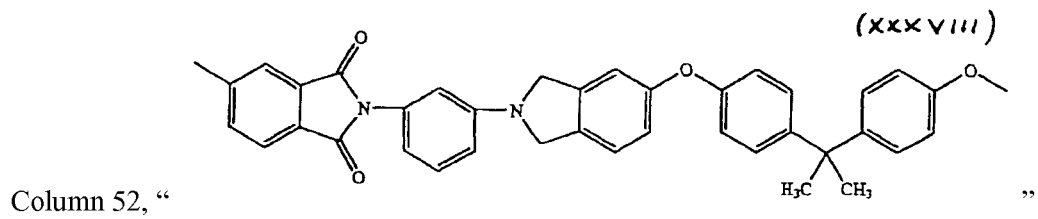 "

should read -- 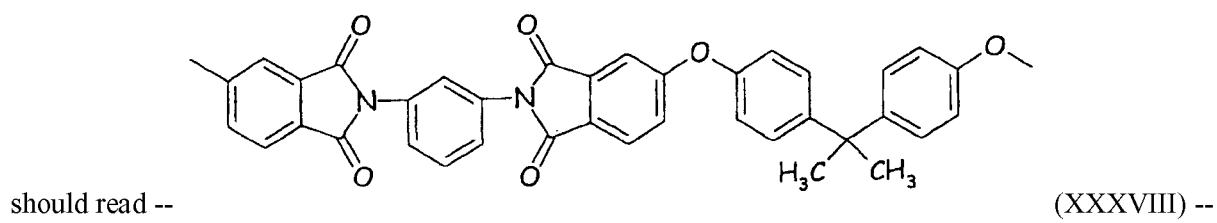 (XXXVIII) --

Column 53, " 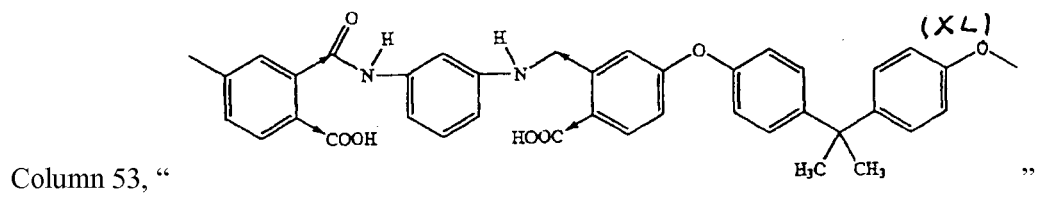 "

should read -- 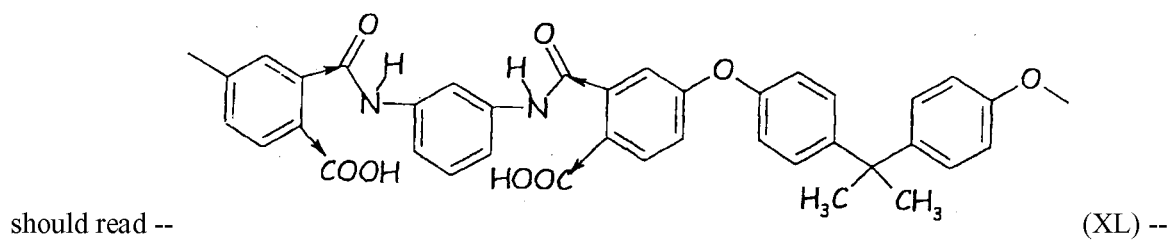 (XL) --

Signed and Sealed this
Twelfth Day of June, 2012

David J. Kappos
*Director of the United States Patent and Trademark Office*